United States Patent
Jayaraman et al.

(10) Patent No.: US 8,850,526 B2
(45) Date of Patent: Sep. 30, 2014

(54) ONLINE PROTECTION OF INFORMATION AND RESOURCES

(75) Inventors: Kesavardhanan Jayaraman, Chennai (IN); Ahmad Abdul Lateef, Kanyakumari District (IN); Gregory Ravi Panakkal, Cochin (IN); Babu Katchapalayam, Cupertino, CA (US)

(73) Assignee: K7 Computing Private Limited, Chennai Tamil Nadu (IN)

( * ) Notice: Subject to any disclaimer, the term of this patent is extended or adjusted under 35 U.S.C. 154(b) by 476 days.

(21) Appl. No.: 13/167,279

(22) Filed: Jun. 23, 2011

(65) Prior Publication Data

US 2011/0321139 A1  Dec. 29, 2011

(30) Foreign Application Priority Data

Jun. 23, 2010  (IN) .......................... 1751/CHE/2010

(51) Int. Cl.
   *G06F 21/00*  (2013.01)
   *G06F 21/51*  (2013.01)
   *G06F 21/57*  (2013.01)
   *G06F 21/55*  (2013.01)

(52) U.S. Cl.
   CPC .............. *G06F 21/51* (2013.01); *G06F 21/575* (2013.01); *G06F 21/554* (2013.01)
   USPC .................................. 726/4; 726/1; 713/165

(58) Field of Classification Search
   CPC ....... G06F 21/50; G06F 21/51; G06F 21/575; G06F 21/554
   USPC ........................................................... 726/4
   See application file for complete search history.

(56) References Cited

U.S. PATENT DOCUMENTS

| | | | | |
|---|---|---|---|---|
| 7,024,689 B2 * | 4/2006 | O'Donnell et al. | ............... | 726/4 |
| 2009/0320050 A1 * | 12/2009 | Pousti et al. | .................. | 719/328 |
| 2009/0328134 A1 * | 12/2009 | Ray et al. | ........................... | 726/1 |
| 2010/0125891 A1 * | 5/2010 | Baskaran | .......................... | 726/1 |
| 2010/0146593 A1 * | 6/2010 | Stahl et al. | ....................... | 726/4 |
| 2011/0030047 A1 * | 2/2011 | Gao et al. | .......................... | 726/9 |
| 2011/0238482 A1 * | 9/2011 | Carney et al. | ............. | 705/14.36 |

* cited by examiner

*Primary Examiner* — Arvin Eskandarnia
(74) *Attorney, Agent, or Firm* — Ash Tankha; Lipton, Weinberger & Husick

(57) ABSTRACT

A computer implemented method and system for protecting information and resources in an online environment is provided. A process initialization monitor application monitors process initialization of a client application provided on a user's communication device. The client application identifies and authenticates one or more components operating on the communication device and one or more third party applications attempting to access the client application. The client application performs the authentication by performing a code integrity check integrated in the client application independent of the communication device, and grants access to the authenticated components and the authenticated third party applications. The client application protects information being processed, exchanged, stored, and displayed within the client application. The client application masks input information, encrypts a communication channel that transfers the input information, blocks attempts to monitor, intercept and manipulate information by unauthorized entities, and prevents access of certificates, resources, etc., by unauthorized entities.

22 Claims, 9 Drawing Sheets

ONLINE PROTECTION OF INFORMATION AND RESOURCES

CROSS REFERENCE TO RELATED APPLICATIONS

This application claims the benefit of provisional patent application number 1751/CHE/2010 titled "Online Protection Of Information And Resources", filed on Jun. 23, 2010 in the Indian Patent Office.

The specification of the above referenced patent application is incorporated herein by reference in its entirety.

BACKGROUND

Crime on the internet using malware programs has evolved into a lucrative business that is controlled in part by organized crime. More than about fifty percent of online users are infected with malware programs that target personal information of a user.

Malware programs that threaten communication on the internet employ a variety of methods, for example, phishing, key logging by logging keystrokes of a user and sending them secretly to a hacker, form grabbing by stealing what the user types into a form, session hijacking by replacing a transaction or adding completely new transactions, content injection by faking information displayed to the user by manipulating web pages, etc. These methods pose a threat, for example, by performing unauthorized transactions using stolen user information, by redirecting the user to malicious websites that may masquerade as legitimate websites, manipulating content of web pages in transit to misrepresent the content to the user, etc. When the user employs a browser application on the user's communication device to access a website of a bank or a brokerage, perform a financial transaction, etc., the malware programs exploit weaknesses in the browser architectures to achieve their malafide purposes.

The primary goal of browser applications is to deliver rich platforms for web applications and allow third party vendors to offer value added services, for example, browser add-ons or extensions such as Flash® of Adobe Systems Incorporated, the portable document format (PDF) of Adobe Systems Incorporated, the Google™ toolbar, etc. The existing browser applications are not designed for securing user information or online transactions. There is an unmet need for distinguishing legitimate value added services from malware programs that utilize the browser infrastructure for malicious purposes.

A security mechanism, for example, a secure sockets layer (SSL) is inadequate for securing transactions, since the architectures of browser applications were originally designed to offer a rich and extensible platform to access a variety of web content. While the SSL promises information security, the networking architectures of these browser applications makes it easy to eavesdrop and hijack or modify information before the information is encrypted or after the information is decrypted at the SSL. Existing security solutions, for example, anti-virus, anti-spyware, etc., that employ signature based detection, are not sufficient due to a huge influx of malware programs. The time lag between the detection of new spyware and deployment of a signature is still long enough to cause substantial damage. Heuristic methods employed to detect new threats cause annoyance, false positives, etc., and often require the user to make a right decision.

Proactive transaction security solutions available today try to counter specific malicious techniques, for example, key logging, instead of fundamental threats, for example, stealing of personal information and performing unauthorized transactions, thereby leaving large security holes.

Operating systems that focus on delivering a rich platform for various applications, expose interfaces to monitor or alter system activities such as key logging, screen capture, networking, file access, etc. While the goal of delivering a rich platform for various applications is to enable third party vendors to offer value added services, for example, accessibility, parental control, firewall, anti-malware, etc., hackers utilize the same for malicious purposes.

Unauthorized entities, for example, malware programs can attempt to directly access memory content and manipulate code and data on a user's communication device. The degree of access varies depending on the operating system of the user's communication device. Some web browsers provide access of the currently displayed web page to multiple third party applications, enabling the third party applications to read and/or modify the web page, for accessibility enhancements. However, this allows the malware programs to read and/or manipulate form data such as passwords and/or manipulate flow of form submission, for example, by form grabbing, content injection, etc.

Browser applications employ a networking layer or a network stack provided by the operating system of the user's communication device to communicate with a web server. The operating system of the user's communication device exposes the network stack to multiple third party vendors who may intercept or manipulate the flow of information, for example, by content filtering, firewall applications, etc. An infrastructure, for example, a layered service provider (LSP) of the Winsock 2 service provider interface (SPI) and a name service provider (NSP) provided by Windows® of Microsoft Corporation allows the third party vendors to replace or layer their code above or below the network stack of the operating system to inspect or modify the communication flow. This feature is exploited by malware programs, for example, to steal information and hijack the transaction at the networking level.

The browser applications also utilize a communication layer on top of the network stack of the operating system to extend supported protocols, for example, "res: file:" used to support loading of content from a local system "JavaScript:" to execute JavaScript, etc. The browser applications also expose the communication layer to third party vendors to provide value added services, for example, content filtering, custom protocols, etc.

In an operating system, for example, Windows® of Microsoft Corporation, a component object model (COM) is used to expose services to third party applications. In an example, JavaScript engines and visual basic script (VBScript) engines are implemented as COM objects. The JavaScript engines and the VBScript engines are vulnerable and allow redirection of the COM objects to a different implementation.

The standard protocols for online transactions are, for example, a hypertext transfer protocol (http) or a hypertext transfer protocol secure (https) protocol. Sensitive information and transactions are exchanged, for example, over the http/https protocols. The http/https protocols provide, for example, content integrity, secrecy, and website identity. There is no need for unauthorized entities, for example, malware programs, to intercept encrypted data, when the encrypted data leaves the application. Malware programs attempt to intercept the data flow before encryption and/or after decryption either by manipulating the network stack of the operating system of the user's communication device or the communication layer of the browser application.

The http protocol provides a feature where websites can store state information, for example, a user's login credentials, session information, etc., in the form of browser cookies or web cookies, on the user's communication device. For example, transaction websites after authenticating the user, store identification data in the form of browser cookies or web cookies to avoid asking the user to login for every request during that session. A networking component of a browser application manages the cookie information and automatically sends the cookie information back to the web site in subsequent requests. After a successful login on a website, the website uses the cookie information to identify the user during subsequent online transactions in order to avoid requesting for the user's login credentials for every click on the website. The malware programs that monitor the communication flow steal the cookie information and conduct unauthorized transactions unbeknown to the user. The websites carry out the requests as the websites are unable to differentiate legitimate requests from the malware programs. Furthermore, the networking component, being caller agnostic, automatically sends the cookie information with every request to respective transaction websites, thereby allowing unauthorized entities such as malware programs running inside the browser application to conduct unauthorized transactions after the user is logged in to the transaction website. The malware programs running inside the browser application simply invoke the networking component to conduct unauthorized transactions once the user logs on to the transaction website.

The https/SSL protocol, employed by transaction websites, uses digital certificates to establish identity of the transaction websites. Browser applications maintain a list of trusted root certificates. For example, certificate authorities issue a secure sockets layer (SSL) certificate from a root certificate and verify a presented SSL certificate of a website by comparing the website name, time stamping, etc., and by ensuring the certificate chain ends up at one of the root certificate stores that the browser applications maintain. For example, typical web browsers maintain lists of trusted root certificates to verify a certificate of a transaction website and identify the transaction website to the user. Moreover, typical operating systems provide application programming interfaces (API) to add or manipulate trusted root certificates in the root certificate stores. Malicious programs can insert their own root certificate to the root certificate store of the browser. Malicious websites purporting to be a legitimate transaction website or unauthorized entities intercepting the data flow between a user's communication device and the transaction website can present a fake certificate which can be identified as trusted by the web browsers because of the manipulation of their root certificate stores.

An internet naming system uses domain name addresses for remembering the addresses of websites. The networking layer or the network stack of the operating system of the user's communication device translates the domain name address into an internet protocol (IP) address, for example, 192.0.43.10. The process of translating the domain name address into the IP address is called domain name resolution. Servers that maintain the mapping and the resolution are called domain name system (DNS) servers. Operating systems typically maintain a local host file that contains a domain name address to IP address mapping to point a domain name to a specific server if needed, and to cache the name resolutions in a domain name system (DNS) resolver cache to speed up subsequent requests. The malware programs intercept the name resolution process and direct the user to malicious websites. The malware programs installed on the user's communication device can modify the local host file, intercept the name resolution request of the website, or manipulate the local domain name system (DNS) resolver cache. The malware programs apply this method to block security measures, for example, blocking a signature file update and thus evade detection. There are also methods that work outside of the user's communication device such as hijacking of domain name system (DNS) servers also referred to as domain name system (DNS) poisoning.

Key logging is one of the commonly used techniques to steal user credentials and sensitive personal information entered on a web page by a user. For example, typical operating systems provide methods to intercept or record keystrokes. Keystrokes emerging from a computer keyboard pass several layers of the operating system and application code before the keystrokes are displayed on a display screen to the user. The malware programs present anywhere in the path of the keystrokes being passed to the operating system of the communication device can intercept the keystrokes at any one of the layers and capture data of the keystrokes. The malware programs may utilize the data to carry out malicious activities. The malware programs may transmit the data to a hacker.

Many websites employ virtual keyboards to prevent the malware programs from capturing the data from the keystrokes. However, the malware programs utilize screen capturing to evade virtual keyboards. Virtual keyboards used by banking websites do not offer much protection as several other techniques are available at the disposal of cyber criminals to steal information or conduct unauthorized transactions. Furthermore, an application, for example, Windows® of Microsoft Corporation, automatically copies window content or desktop content to a clipboard when a print screen key is pressed. The content from the clipboard can easily be accessed as an image or saved to a file. The malware programs can simulate this print screen keystroke to capture the content of a website with the virtual keyboard. Malware programs can take a screenshot as soon as the user selects a key on the virtual keyboard and record the position of a mouse pointer to figure out which key was pressed.

Hence, there is a long felt but unresolved need for a computer implemented method and system that provides a rich platform for websites and allows third party vendors to offer value added services, while distinguishing legitimate value added services from malware programs, protecting memory content, and hence preventing manipulation of code and data. Moreover, there is a need for a computer implemented method and system that prevents access of a displayed web page to multiple third party applications and prevents interception or manipulation of the flow of information by unauthorized entities, for example, malware programs. Furthermore, there is a need for a computer implemented method and system that prevents interception of data flow before encryption and/or after decryption, prevents the malware programs from monitoring communication flow to prohibit stealing of cookie information and conducting of unauthorized transactions unbeknown to the user by the malware programs, prevents tampering of trusted root certificate stores, and blocks third party interception and manipulation of a default configured domain name system. Furthermore, there is a need for a computer implemented method and system that ensures loading of authenticated original component services exposed by component object model (COM) objects and also secures transfer of input information acquired from a user via an input device.

SUMMARY OF THE INVENTION

This summary is provided to introduce a selection of concepts in a simplified form that are further disclosed in the detailed description of the invention. This summary is not intended to identify key or essential inventive concepts of the claimed subject matter, nor is it intended for determining the scope of the claimed subject matter.

The computer implemented method and system disclosed herein addresses the above mentioned needs for distinguishing legitimate value added services from unauthorized entities, protecting memory content, and preventing manipulation of code and data. As used herein, the term "unauthorized entities" refers to software or programs with malicious intent that attempt to operate either internally on a user's communication device or externally via a communication medium designed to infiltrate the user's communication device without the user's consent. The unauthorized entities are, for example, malware programs such as viruses, worms, Trojans, etc., unauthorized application codes, malicious libraries, malicious scripts on a website, etc. The term "malicious intent" refers to altering or subverting established system functionality, or gaining access to restricted user information and system information for malicious purposes, for example, performing unauthorized transactions using stolen user information, etc.

Furthermore, the computer implemented method and system disclosed herein prevents access of a displayed web page to multiple third party applications, prevents interception or manipulation of the flow of information by unauthorized entities, prevents interception of data flow before encryption and/or after decryption, prevents unauthorized entities from monitoring communication flow to prohibit stealing of cookie information and conducting unauthorized transactions unbeknown to the user, prevents tampering of trusted root certificate stores, and blocks third party interception and manipulation of a default configured domain name system. Furthermore, the computer implemented method and system disclosed herein secures transfer of input information acquired from the user via an input device. The computer implemented method and system disclosed herein also ensures loading of authenticated original component services exposed by component object model (COM) objects.

The computer implemented method and system for protecting information and resources in an online environment disclosed herein provides a process initialization monitor application and a client application on a communication device of a user. As used herein, the term "client application" refers to a software application located at a client side that accesses and interacts with remote services and computer systems via a network, and that protects the user's communication device from unauthorized entities, for example, malware programs residing on the communication device or operating via an external communication medium, and that secures the device resources and environment. Also, as used herein, the term "process initialization monitor application" refers to an external component that supervises and controls the initialization of the client application, and prevents unauthorized access to the client application.

The user invokes the client application in the online environment. As used herein, the term "online environment" refers to an environment that enables accessing or sharing of information between users, their communication devices, applications, and one or more server computers over a network, for example, the internet. The process initialization monitor application monitors process initialization of the client application. The monitoring of the process initialization of the client application comprises, for example, one or more of monitoring operating system libraries loaded for the process initialization of the client application on the communication device, blocking attempts by unauthorized entities to load malicious libraries and alternate code paths within the client application, preventing interception of library calls by the unauthorized entities, etc.

In an embodiment, the monitoring of the process initialization of the client application comprises, for example, monitoring requests of one or more components and one or more third party applications to access processes and threads of the client application. The client application monitors the requests and automatically alters access permissions of unauthorized entities for preventing modification of memory content and execution of alternate code paths of the client application by the unauthorized entities.

The client application identifies one or more components operating on the communication device and one or more third party applications attempting to access the client application during performance of activities by the user in the online environment. As used herein, the term "components" refers to a set of reusable software modules that provide services to applications executing on the user's communication device or being accessed by the user via a network. For example, the components comprise application code that executes specific functions, operating system libraries, component object model (COM) objects, library components of an operating system, networking components, etc. In an example, the components also comprise disguised malware libraries, malware programs, etc. Also, as used herein, the term "third party applications" refers to applications that operate external to a system environment of the user's communication device and that interact with the user's communication device and/or with one or more components operating on the user's communication device via a network, for example, the internet. The third party applications comprise, for example, Adobe® Flash of Adobe Systems Incorporated, portable document format (PDF) of Adobe Systems Incorporated, etc., that work with the components operating on the user's communication device.

The client application authenticates the components of the communication device and the third party applications. In an embodiment, the client application performs the authentication by a code integrity check integrated in the client application independent of the communication device. As used herein, the term "code integrity check" refers to procedures for verifying authenticity and publisher identity of an application code, for example, by verifying a digital certificate of the application code. The client application grants access to the authenticated components and the authenticated third party applications.

In an embodiment, the client application monitors access to objects that expose services in the online environment and ensures loading of authenticated original component services exposed by the objects. As used herein, the term "object" refers to an encapsulated entity, for example, a component object model (COM) object that enables interprocess communication and dynamic object creation in a large range of programming languages. The objects are reusable across different computing environments.

The client application protects information and resources being processed, exchanged, stored, and displayed within the client application. The client application masks input information acquired from the user via an input device associated with the user's communication device for protecting the input information from being accessed by unauthorized entities. The client application masks display content or screen content captured from interfaces of the client application and the communication device. In an embodiment, the client application encrypts a communication channel that transfers the input information acquired from the user via the input device for securing the transfer of the input information. Furthermore, the client application blocks attempts by unauthorized entities to monitor, intercept, and manipulate information being processed, exchanged, stored, and displayed within the client application, and prevents access of certificates, resources of the client application, and the information being processed, exchanged, stored, and displayed within the client application by unauthorized entities in the online environment. The client application also prohibits access of memory content to unauthorized entities and manipulation of code and data of the client application by the unauthorized entities.

In an embodiment, the client application protects information by preventing redirection from a requested online destination to one or more unauthorized entities in the online environment. As used herein, the term "online destination" refers to an electronic address that defines a location of resources in an online environment. The online destination is, for example, an http/https request, website address, domain name address, a uniform resource locator (URL), etc.

The computer implemented method and system disclosed herein further provides a secure domain name system server that bypasses a default configured domain name system for preventing redirection from a requested online destination to one or more unauthorized entities in the online environment.

In an embodiment, the client application employs a hypertext transfer protocol layer or a hypertext transfer protocol secure layer integrated with the client application for validating requests for state information in the online environment. As used herein, the term "state information" refers to information that identifies and records a user's interactions within the online environment. The state information comprises, for example, session identification information such as cookie information and user identification information such as login information, stored passwords, website preferences of the user, etc. Furthermore, the hypertext transfer protocol layer or the hypertext transfer protocol secure layer integrated with the client application prevents attempts by unauthorized entities to intercept the state information or manipulate the information exchanged in the online environment.

The client application provides one or more databases that store certificates of multiple validated online portals in the online environment. As used herein, the term "online portal" refers to a collection of related online electronic documents hosted on a server that is accessed via a network, for example, the internet. For example, the online portal is a website and the online electronic document is a web page. The client application protects the databases from tampering. The client application verifies authenticity of the requested online portal by verifying certificates received from the requested online portal, for example, over a secure sockets layer (SSL) protocol, against the stored certificates in the databases.

The client application continuously monitors activities performed by the user in the online environment for alerting the user to manually invoke the client application or for automatically invoking the client application for protecting the information and the resources being processed, exchanged, stored, and displayed in the online environment.

In an embodiment, the client application monitors network providers for detecting attempts by unauthorized entities to layer or replace an application code on one or more layers of a network stack of an operating system of the communication device, when the network stack is initialized within an environment of the client application. The client application bypasses the unauthorized entities and loads authorized network providers on one or more layers of the network stack of the operating system within the environment of the client application. Therefore, the client application blocks attempts by the unauthorized entities to intercept and modify the communication flow in the online environment.

The computer implemented method and system disclosed herein protects personal information and online transactions from existing as well as future threats by employing the client application. By defining and narrowing down online transaction behavior, the client application secures its browsing environment by allowing only trusted components and trusted third party applications required for online transaction websites, and thus eliminating the need for behavioral technology to identify malicious programs or attempts. Any attempt to access the online environment is blocked by default without any annoying prompts or user intervention, thereby providing security for information and transaction protection.

BRIEF DESCRIPTION OF THE DRAWINGS

The foregoing summary, as well as the following detailed description of the invention, is better understood when read in conjunction with the appended drawings. For the purpose of illustrating the invention, exemplary constructions of the invention are shown in the drawings. However, the invention is not limited to the specific methods and instrumentalities disclosed herein.

DETAILED DESCRIPTION OF THE INVENTION

Figure 1:
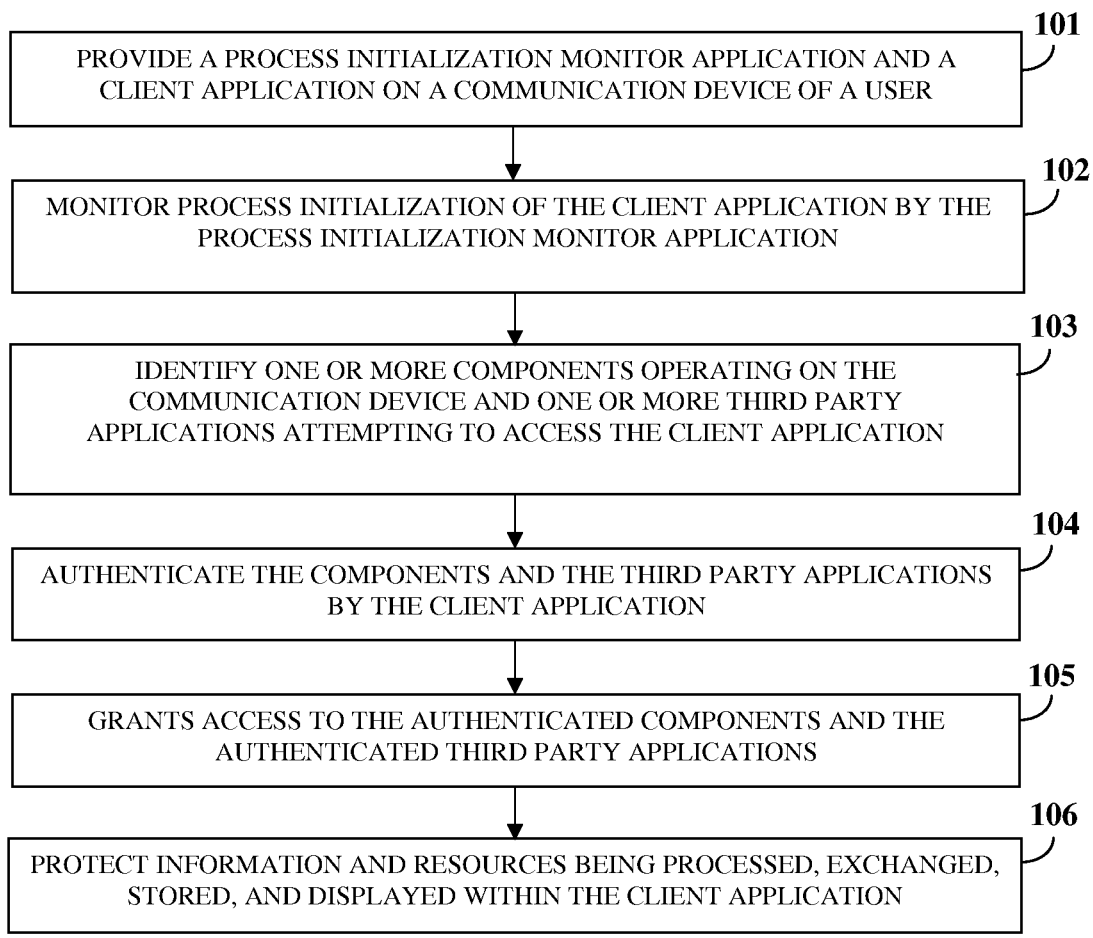
FIG. 1 illustrates a computer implemented method for protecting information and resources in an online environment.

FIG. 1 illustrates a computer implemented method for protecting information and resources in an online environment. As used herein, the term "online environment" refers to an environment that enables accessing or sharing of information between users, their communication devices, applications, and one or more server computers over a network, for example, the internet. The computer implemented method disclosed herein provides 101 a process initialization monitor application and a client application on a communication device of the user. As used herein, the term "client application" refers to a software application located at a client side that accesses and interacts with remote services and computer systems via a network, and that protects the user's communication device from unauthorized entities residing on the user's communication device or operating via an external communication medium, and that secures the device resources and environment. Also, as used herein, the term "process initialization monitor application" refers to an external component that supervises and controls the initialization of the client application, and prevents unauthorized access to the client application.

The process initialization monitor application performs a secure process initialization of the client application and also supervises and protects the client application from unauthorized access by unauthorized entities during the execution of the client application. As used herein, the term "unauthorized entities" refers to software or programs with malicious intent that attempt to operate either internally on a user's communication device or externally via a communication medium designed to infiltrate the user's communication device without the user's consent. The unauthorized entities are, for example, malware programs such as viruses, worms, Trojans, etc., unauthorized application codes, malicious libraries, malicious scripts on a website, etc. The term "malicious intent" refers to altering or subverting established system functionality, or gaining access to restricted user information and system information for malicious purposes, for example, performing unauthorized transactions using stolen user information, etc. The communication device is, for example, a personal computer, a laptop, a mobile phone, a personal digital assistant, a tablet computing device, etc. The user invokes the client application in an online environment. The user utilizes the client application for submitting, for example, personal information securely, and for protecting online transactions. The client application acts as an interface between the user and the online environment.

An operating system on the user's communication device aids in process initialization of the client application before the control is transferred to application code of the client application. The process initialization monitor application monitors 102 process initialization of the client application. The monitoring of the process initialization of the client application comprises, for example, one or more of monitoring operating system libraries loaded for the process initialization of the client application on the user's communication device, blocking attempts by unauthorized entities to load malicious libraries and alternate code paths within the client application, preventing interception of library calls by the unauthorized entities, etc. For example, the client application blocks an unauthorized entity, for example, malware, from physically modifying an executable file or library on the user's communication device or in the online environment, from modifying an entry point of a function call in the application code of the client application to redirect the client application to spurious code of the malware, from inserting wrapper libraries to intercept function calls, etc.

The process initialization monitor application intercepts standard operating system infrastructure services and blocks any unauthorized code execution flow changes or process memory changes of the client application. For example, typical operating systems provide an infrastructure that allows an application component to supervise process creation and initialization and also provides the ability to alter execution flow before a target application begins execution. Moreover, these operating systems also allow alteration of an application environment comprising, for example, an application's memory content from another application. Unauthorized entities exploit these provisions of a typical operating system infrastructure for modifying the initialization flow of the client application to load unauthorized libraries, alter codes of the client application, intercept library calls to disable critical functions of the client application, for example, self protection and intercept functions of the client application, or modify critical online transaction information. The process initialization monitor application blocks the unauthorized entities from making unauthorized code execution flow changes in the client application or altering memory content of the processes of the client application.

Furthermore, the process initialization monitor application also continuously monitors requests initiated by one or more components and one or more third party applications to access processes and threads of the client application during execution of the client application. The process initialization monitor application automatically alters access permissions of unauthorized entities for preventing modification of memory content and execution of alternate code paths of the client application by the unauthorized entities. For example, typical operating systems provide the ability to alter an application environment comprising, for example, an application's memory content, from another application. The applications that attempt to access another application send a request for access to the operating system by explicitly specifying the desired access required, for example, read/write memory of a target process, or a request to change execution flow of a thread in the target process. The process initialization monitor application intercepts such requests and blocks unauthorized attempts if the target process or thread belongs to the client application.

After the process initialization, the process initialization monitor application transfers the control to the client application. The client application secures its environment by intercepting critical access points, for example, library loading, object loading, and network provider loading. The client application identifies 103 one or more components operating on the user's communication device and one or more third party applications attempting to access the client application during performance of activities by the user in the online environment. As used herein, the term "components" refers to a set of reusable software modules that provide services to applications executing on the user's communication device or being accessed by the user via a network. The components comprise, for example, application code that executes specific functions, operating system libraries, component object model (COM) objects, library components of an operating system, networking components, etc. Also, as used herein, the term "third party applications" refers to applications that operate external to a system environment of the user's communication device and that interact with the user's communication device and/or with one or more components operating on the user's communication device via a network, for example, the internet. For example, the third party applications work with the components of the user's communication device such as Adobe® Flash of Adobe Systems Incorporated, portable document format (PDF) of Adobe Systems Incorporated, etc.

The client application authenticates 104 the components operating on the user's communication device and the third party applications attempting to access the client application. The client application performs the authentication, for example, by using a code integrity check integrated into the client application independent of the user's communication device. As used herein, the term "code integrity check" refers to procedures for verifying authenticity and publisher identity of an application code, for example, by verifying a digital certificate of the application code. Since the code integrity check is integrated into the client application independent of the user's communication device, the client application prevents evasion of a check caused by a compromised code integrity check infrastructure of the user's communication device. The client application employs code signing with digital signatures to establish the identity and integrity of the components and the third party applications. The client application executes and grants 105 access to the authenticated components and the authenticated third party applications.

The client application protects 106 information and resources being processed, exchanged, stored, and displayed within the client application. As used herein, the term "information" refers to input information acquired from a user, state information, display content, resources of the client application, certificates, etc. The input information refers to any information, for example, personal information, demographic information, banking data, user credentials, etc., provided by the user to the interfaces of the client application and/or the user's communication device. As used herein, the term "state information" refers to information that identifies and records a user's interactions within the online environment. The state information comprises information exchanged during an online session with a server, for example, session cookies, passwords, etc. The resources of the client application are, for example, application code, libraries, etc. The certificates are, for example, digital signature certificates, trusted website certificates, etc.

In an embodiment, the client application masks input information acquired from the user via an input device associated with the communication device for protecting the input information from being accessed by unauthorized entities. The input device is, for example, a keyboard, a touchpad, etc., of the user's communication device. In an embodiment, the client application intercepts the input information immediately after acquiring the input information from the input device. In an example, the client application interfaces a keyboard driver of the user's communication device. The client application bypasses a standard keyboard path and retrieves keystrokes using a secure communication channel. As used herein, a "secure communication channel" refers to a secured path with authenticated transmission and reception points that allows transfer of input information acquired from the user without the input information being detected and modified by unauthorized entities. For example, the secure communication channel is a path between a point of reception of the original input information from the user and a point of reception of the original input information by a rendering engine window procedure of an operating system of the user's communication device, that is resistant to tampering and interception by unauthorized entities, and over which the input information received from the user is securely transferred to the rendering engine window procedure of the operating system.

In an embodiment, a masked keystroke can also be passed through the standard keyboard path to synchronize keystrokes. An unauthorized entity intercepting or listening on the standard keyboard path will be unable to detect the actual keystrokes or can detect only the masked keystrokes.

In an embodiment, the client application encrypts a standard communication channel that transfers the input information acquired from the user via an input device associated with the communication device for securing the transfer of the input information. As used herein, the term "standard communication channel" refers to an established default path between a point of reception of the original input information from the user to a point of reception of the original input information by the rendering engine window procedure of an operating system of the user's communication device. The client application encrypts the standard communication channel, for example, by employing an asymmetric encryption method to encrypt input information such as keystrokes. The asymmetric encryption method uses, for example, a public key for encryption herein referred to as an "encryption key" and a private, protected key for decryption herein referred to as a "decryption key". The client application dynamically generates a key pair comprising the encryption key and the decryption key. The client application encrypts the keystrokes using the encryption key and transmits the encrypted keystrokes over the standard communication channel to the rendering engine window procedure of the operating system. The rendering engine window procedure decrypts the encrypted keystrokes using the decryption key.

Furthermore, the client application masks display content or screen content captured from interfaces, for example, display windows, screens, etc., of the client application and the communication device. For example, the client application blocks capture of screenshots of a display screen used to record the information entered by the user. In an example, the client application prevents capture of cursor movements of a mouse pointer or other pointing device used to record information input, for example, through a virtual keypad. Furthermore, the client application blocks creation of an image for capturing the cursor movements, creation of a file for storing the cursor movements, and blocks simulation of print screen keystrokes for capturing screenshots of the display screen on the communication device. For example, typical operating systems provide a screen capture application programming interface (API) to capture an image of the entire or a portion of the display screen. When a user presses the print screen (Prt Scr) key on a keyboard or a touchpad on the user's communication device, the operating system places a copy of the current display content on a clipboard. The current display content can be retrieved from the clipboard by a component or an application running on the user's communication device. Unauthorized entities can use the screen capture API or simulate the print screen keystroke to capture sensitive information displayed on a display screen of the user's communication device. The client application intercepts the screen capture API provided by the operating system on the communication device and blocks the unauthorized entities from capturing the display content from a targeted display area within the interface of the client application on the display screen. Furthermore, the client application blocks simulated print screen keystrokes initiated by the unauthorized entities when the interface of the client application is visible on the display screen of the communication device.

The client application blocks attempts by unauthorized entities to monitor, intercept, and manipulate information being processed, exchanged, stored, and displayed within the client application, and prevents access of certificates, resources of the client application, the information processed, exchanged, stored, and displayed within the client application etc., by the unauthorized entities in the online environment. As used herein, the term "resources" of the client application refers to information, certificates, memory content, code, data, etc., of the client application. The client application prohibits access of memory content to unauthorized entities and manipulation of code and data of the client application by the unauthorized entities. The degree of access of the memory content by the unauthorized entities varies depending, for example, on the operating system of the user's communication device.

The client application blocks attempts by unauthorized entities to capture and manipulate web content on an online portal accessed by the user. As used herein, the term "online portal" refers to a collection of related online electronic documents, for example, web pages, hosted on a server that is accessed via a network such as the internet. The online portal is, for example, a website. The client application does not provide any access to web content processed and displayed in the online environment. The client application hence disallows unauthorized entities from reading or modifying the information displayed, for example, on a web page within the client application. Therefore, the client application prevents unauthorized entities from reading or manipulating form data such as passwords that is performed, for example, by form grabbing and/or content injection or by manipulating the form submission flow.

In an embodiment, the computer implemented method disclosed herein provides one or more databases that store certificates of multiple validated online portals in the online environment. The client application protects the databases from tampering by unauthorized entities. The client application verifies authenticity of a requested online portal by verifying certificates received from the requested online portal, for example, over a secure sockets layer (SSL) protocol, against the stored certificates in the databases. The client application protects the databases from tampering and ensures that the verification procedure is not compromised by unauthorized entities. The client application provides, for example, a trusted root certificate database and a trusted website certificate database. The trusted root certificate database stores a list of certificates of trusted root certificate authorities. The trusted web site certificate database stores a list of certificates of trusted websites.

In an embodiment, the trusted root certificate database and the trusted website certificate database of the client application are digitally signed to detect any unauthorized modification of the databases. The client application performs a standard certificate validation, and also checks, for example, a website certificate received from a website against a list of website certificates maintained by the client application in the trusted website certificate database to positively identify, for example, transaction websites. In an example, the client application considers a fingerprint of the website certificate for comparison and verification. In another embodiment, the client application intercepts the application programming interface (API) that allows addition of trusted root certificates to the trusted root certificate database, and performs a code integrity check on the components attempting to use the API. In this manner, the computer implemented method disclosed herein defeats any malicious attempt to steal personal information of the user by presenting fake certificates or by manipulating the trusted root certificate database. That is, the client application prevents malicious programs from inserting their own root certificates in the trusted root certificate database.

The client application monitors network providers for detecting attempts by unauthorized entities to layer or replace an application code on one or more layers of a network stack of an operating system of the communication device, when the network stack is initialized in an environment of the client application. The client application bypasses the unauthorized entities and loads authorized network providers on one or more layers of the network stack of the operating system within the environment of the client application. For example, typical operating systems permit layering of third party network providers over operating system providers such as layered service providers (LSP) and name service providers (NSP) and allows the third party network providers to replace the operating system providers on one or more layers of the network stack. Blocking the loading of unauthorized network providers directly may cripple the network communication. Hence, the client application enumerates through the installed network providers and alters the layering within its environment to allow only the trusted network providers to load on one or more layers of the network stack of the operating system. Furthermore, the client application detects if the operating system provider is replaced by one or more unauthorized entities and always loads the correct operating system provider in case a replacement occurs.

The client application employs a security layer, for example, a hypertext transfer protocol (http) layer or a hypertext transfer protocol secure (https) layer integrated with the client application for validating requests for state information in the online environment and preventing attempts by unauthorized entities to intercept the state information or manipulate the information exchanged in the online environment. The state information refers to information that identifies and records the user's interactions within the online environment. The state information comprises, for example, session identification information such as cookie information and user identification information such as login information, stored passwords, website preferences of the user, etc. The client application validates, for example, a requestor of the cookie information. The client application allows a rendering engine of the client application and the authenticated third party applications, for example, trusted extensions, to send a request to a website. The trusted extensions are, for example, Flash® of Adobe Systems Incorporated, the portable document format (PDF) of Adobe Systems Incorporated, the Google™ toolbar of Google, Inc., etc.

The client application monitors the network communication within its environment for any interception of the network communication to access or manipulate unencrypted data that takes place within the environment of the client application. The client application allows only authorized components to load into the environment of the client application and blocks any code manipulation, unauthorized access or manipulation of the network communication.

The client application prevents redirection from a requested online destination to one or more unauthorized entities in the online environment. As used herein, the term "online destination" refers to an electronic address that defines a location of resources in an online environment. The online destination is, for example, an http/https request, a website address, a domain name address, a uniform resource locator (URL), etc. In an example, the client application blocks third party interception and manipulation of a domain name resolution procedure. The client application circumvents a local host file and a domain name system (DNS) resolver cache on the user's communication device and uses a secure domain name system (DNS) server to perform name resolution lookups. The secure DNS server bypasses a default configured domain name system for preventing redirection from a requested online destination to one or more unauthorized entities in the online environment. The communication between the client application and the secure DNS server is secured by ensuring integrity and authenticity of a name resolution response. In an embodiment, domain name system (DNS) resolutions returned by the secure DNS server are digitally signed in compliance with domain name system security extensions (DNSSEC) to enable the client application to verify the authenticity of the DNS name resolution response received from the secure DNS server.

Furthermore, the client application continuously monitors activities performed by the user in the online environment for alerting the user to manually invoke the client application for protecting information being processed, exchanged, stored, and displayed in the online environment or for automatically invoking the client application for protecting information being processed, exchanged, stored, and displayed in the online environment. For example, the user is alerted to invoke the client application when the user attempts to access a website that involves exchange of personal information and online transaction information. Consider an example where the user works with a default browser application and attempts to access an online banking website that requests account details of the user. In this example, the client application is automatically invoked and the client application validates the online banking website and the online transaction with the online banking website.

Figure 2A:
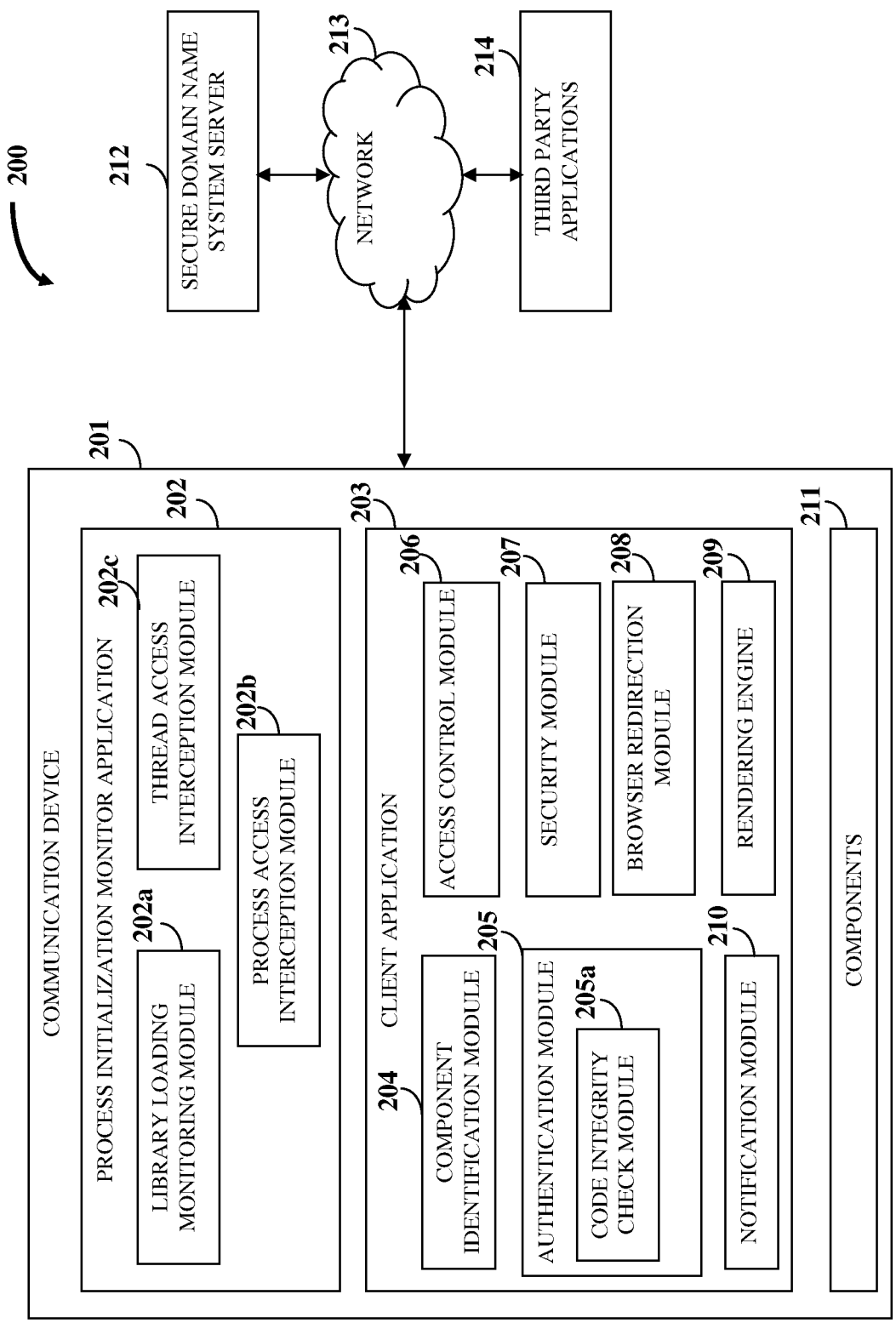
FIGS. 2A-2B illustrate a computer implemented system for protecting information and resources in an online environment.
Figure 2B:
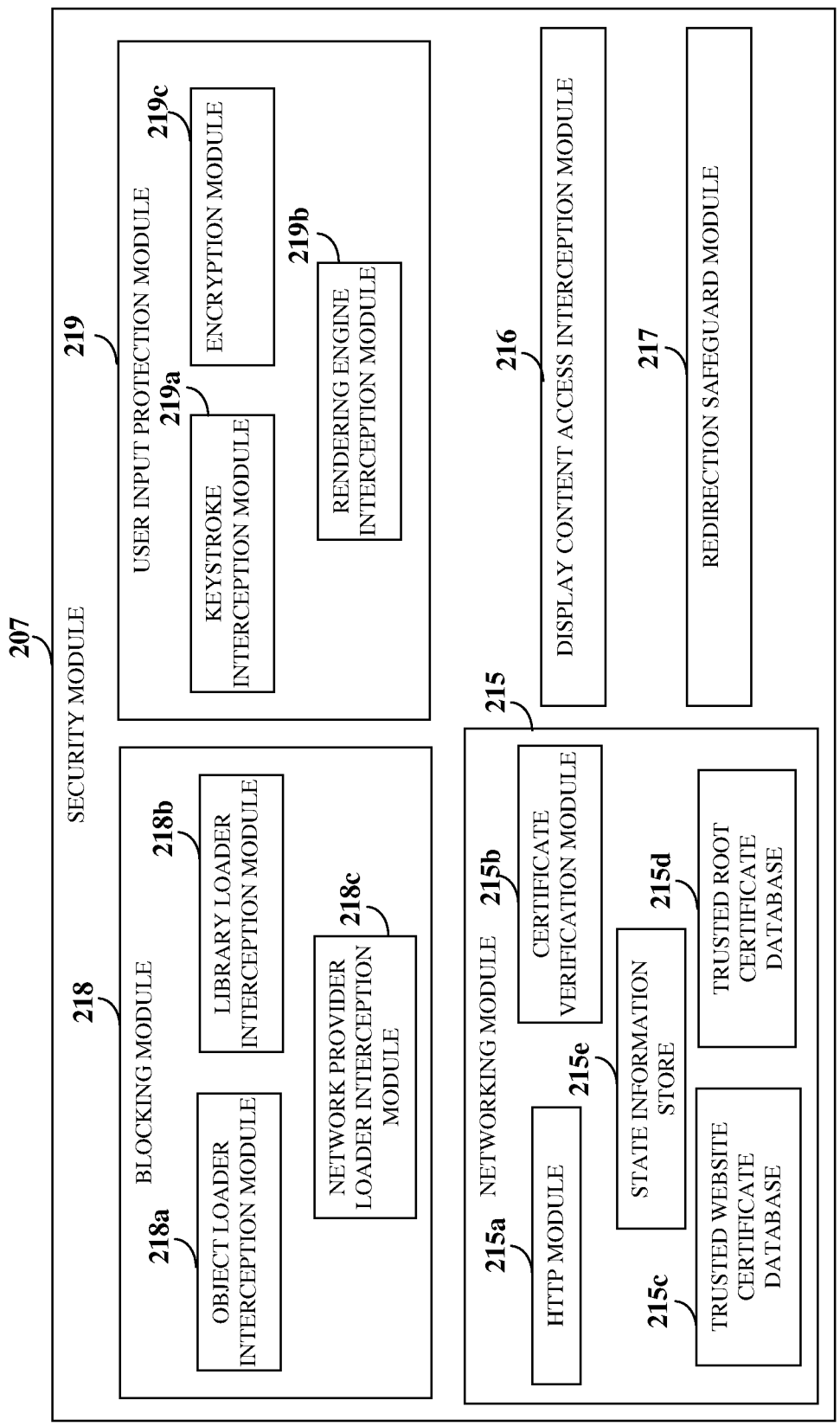

In an embodiment, the client application monitors access to objects that expose services in the online environment and ensures loading of authenticated original component services exposed by the objects as disclosed in the detailed description of FIGS. 2A-2B. As used herein, the term "object" refers to an encapsulated entity, for example, a component object model (COM) object that enables interprocess communication and dynamic object creation in a large range of programming languages. The objects are reusable across different computing environments. For example, typical operating systems maintain a separate COM object database where an object identifier and its corresponding location are stored to achieve location transparency from the user of the COM objects. Applications that intend to use one of the COM objects specify only the object identifier. The COM object database can be manipulated by unauthorized applications to redirect a specific COM object to their own implementation. The client application intercepts loading of the COM objects and verifies whether the location still points to the original COM object and loads the original COM object even if the COM object is redirected to an unauthorized implementation. Furthermore, in an embodiment, the client application identifies the original implementation of the COM object using code signing to check the validity and integrity of the COM object implementation.

FIGS. 2A-2B illustrates a computer implemented system 200 for protecting information and resources in an online environment. As exemplarily illustrated in FIG. 2A, the computer implemented system 200 disclosed herein comprises a process initialization monitor application 202 and a client application 203 provided on a communication device 201 of a user. The computer implemented system 200 disclosed herein further comprises a secure domain name system (DNS) server 212 that communicates with the user's communication device 201 via a network 213. The network 213 is, for example, a local area network, a wide area network, the internet, a wired network, a wireless network, a mobile communication network, etc. The client application 203 on the user's communication device 201 communicates with the secure domain name system server 212 via the network 213. Third party applications 214 may access and communicate with the client application 203 via the network 213.

The process initialization monitor application 202 monitors the process initialization of the client application 203. The process initialization monitor application 202 resides on the user's communication device 201 external to the client application 203. The process initialization monitor application 202 ensures that process initialization of the client application 203 is completed successfully by an operating system running on the user's communication device 201, without tampering by unauthorized entities. The process initialization monitor application 202 comprises a library loading monitoring module 202a, a process access interception module 202b, and a thread access interception module 202c.

The library loading monitoring module 202a monitors operating system libraries loaded for the process initialization of the client application 203 on the communication device 201, blocks attempts by unauthorized entities to load malicious libraries and alternate code paths within the client application 203, and prevents interception of library calls by the unauthorized entities. The library loading monitoring module 202a ensures that control is transferred to the client application 203 after the process initialization. The library loading monitoring module 202a allows loading of authenticated components 211, for example, required operating system libraries of the user's communication device 201 and blocks any attempt to load components 211, for example, malicious libraries installed by a malware on the user's communication device 201. The library loading monitoring module 202a ensures that only standard process initialization occurs. Furthermore, the library loading monitoring module 202a prevents the unauthorized entities from injecting code, intercepting library calls or loading malicious libraries using the operating system of the user's communication device 201. For example, the library loading monitoring module 202a prevents an unauthorized entity such as a malware from injecting spurious code in the application code of the client application 203.

The process access interception module 202b monitors requests of one or more components 211 and one or more third party applications 214 to access processes of the client application 203 and blocks attempts by unauthorized entities to access the processes of the client application 203. The thread access interception module 202c monitors requests of one or more components 211 and one or more third party applications 214 to access threads of the client application 203 and blocks attempts by unauthorized entities to access the threads of the client application 203.

The process access interception module 202b and the thread access interception module 202c continuously monitor requests of one or more components 211 and one or more third party applications 214 to access processes and threads of the client application 203 respectively. The process access interception module 202b and the thread access interception module 202c automatically alter access permissions of unauthorized entities for preventing access to or modification of memory content and execution of alternate code paths of the client application 203 by the unauthorized entities. The process access interception module 202b and the thread access interception module 202c prevent the unauthorized entities' attempts to compromise the client application 203 any time during the execution. For example, the process access interception module 202b and the thread access interception module 202c strip offending permissions from requests to access or modify a memory, execute alternate code paths, access a process and/or a thread by unauthorized entities. The process access interception module 202b and the thread access interception module 202c therefore defeat any attempts to read or modify memory or execute alternate code paths within the client application 203 by unauthorized entities, thereby preventing changes in the application code flow. After the process initialization, the process initialization monitor application 202 transfers the control to the client application 203. The process access interception module 202b and the thread access interception module 202c prohibit access of the memory content to unauthorized entities and manipulation of code and data of the client application 203 by the unauthorized entities.

The client application 203 comprises a component identification module 204, an authentication module 205, an access control module 206, a security module 207, and a browser redirection module 208. The component identification module 204 identifies one or more components 211 operating on the communication device 201 and one or more third party applications 214 attempting to access the client application 203 when the user performs activities in the online environment. The component identification module 204 identifies the components 211 to distinguish between trusted authenticated components 211 such as valid operating system libraries, and unauthorized entities such as malicious libraries requested by a third party application 214. For example, the component identification module 204 identifies libraries and extension applications requested by a web application executing on a website to decide whether the libraries can be loaded by the operating system.

The authentication module 205 of the client application 203 authenticates the components 211 of the communication device 201 and the third party applications 214. The access control module 206 communicates with the authentication module 205 to grant access only to the authenticated components 211 and the authenticated third party applications 214. The authentication module 205 comprises a code integrity check module 205a integrated in the client application 203 independent of the communication device 201. The code integrity check module 205a operates independent of an operating system on the communication device 201. In an example, typical operating systems utilize their root certificate databases to verify digital signing of code. An unauthorized entity can intercept and manipulate the operating system provided code integrity check module and also manipulate the root certificate database to falsely provide its own identity as trusted. The independence of the code integrity check module 205a from the operating system ensures that the code integrity check procedure is protected from tampering and from being compromised by unauthorized entities. The code integrity check module 205a authenticates the components 211 and the third party applications 214 independent of the user's communication device 201. The code integrity check module 205a prevents evasion of the authentication by an unauthorized entity caused due to a compromised code integrity check infrastructure of the operating system.

The code integrity check module 205a integrated in the client application 203 independent of the communication device 201 authenticates and validates components 211, for example, library components, by performing a code integrity and publisher check using digital certificates to ascertain that application code of the library components has been published by a trusted publisher and has not been modified by an unauthorized entity. The code integrity check module 205a uses a digital signature technology for verifying that the application code has not been modified since the creation of the application code and for verifying the credentials of the publisher of the application code. For example, the code integrity check module 205a applies industry standard compliant cryptography techniques such as X.509 v3 certificate standards. In an embodiment, the code integrity check module 205a uses the Authenticode™ of Microsoft Corporation for performing the code integrity and publisher check. The code integrity check module 205a obtains a public key from the digital certificate which complements the private key used by the publisher of the application code, to verify the validity of the source of the application code.

The access control module 206 of the client application 203 grants access to the authenticated components 211 and the authenticated third party applications 214. The access control module 206 grants or denies access to the components 211 and the third party applications 214 based on instructions received from the authentication module 205. In an embodiment, the access control module 206 prohibits access of memory content by the unauthorized entity and manipulation of code and data of the client application 203 by the unauthorized entity.

In an embodiment, the client application 203 further comprises a rendering engine 209. The rendering engine 209 collects marked up content such as hypertext markup language (HTML) files, image files, etc., and formatting information such as cascading style sheets (CSS) files, etc., formats the content, and displays the formatted content on an interface of the client application 203 on a display screen of the communication device 201. A software component that carries out the rendering operation is referred to as the rendering engine window procedure.

The security module 207 protects information and resources being processed, exchanged, stored, and displayed within the client application 203. For example, the security module 207 protects input information entered by the user, system resources, state information exchanged with an online portal such as a website, digital certificates of trusted applications, application code of the client application 203, etc. As exemplarily illustrated in FIG. 2B, the security module 207 comprises a blocking module 218, a user input protection module 219, a networking module 215, a display content access interception module 216, and a redirection safeguard module 217.

The blocking module 218 blocks attempts to monitor, intercept, and manipulate user information and system information by unauthorized entities, and prevents access of certificates, resources of the client application 203, and the input information and system information by the unauthorized entities in the online environment. The blocking module 218 comprises an object loader interception module 218a, a library loader interception module 218b, and a network provider loader interception module 218c. The blocking module 218 secures the online environment by intercepting critical access points during library loading, object loading, and network provider loading operations performed on the user's communication device 201.

The object loader interception module 218a monitors access to objects that expose services in the online environment and ensures loading of authenticated original component services exposed by the objects. The objects are, for example, component object model (COM) objects. COM objects expose services to third party applications 214. In an example, JavaScript and Visual Basic Script (VBScript) engines are implemented as COM objects. The location and implementation transparency of COM architecture facilitates easy redirection of the COM objects to a different implementation. The object loader interception module 218a intercepts the COM object loading and verifies whether the location still points to the original COM object and loads the original COM object even if the COM object is redirected to an unauthorized implementation. Furthermore, in an embodiment, the object loader interception module 218a in communication with the authentication module 205 identifies an original implementation using code signing to check the validity and integrity of the object implementation. Hence, the object loader interception module 218a monitors access to the COM objects and ensures loading of authenticated original component services even if the COM objects are redirected.

The library loader interception module 218b monitors access requests to load library components during performance of activities by the user in the online environment. The library loader interception module 218b monitors and identifies, for example, load library component requests within the client application 203. The library loader interception module 218b blocks library components that are not required for online activities. The library loader interception module 218b allows authenticated components 211, for example, trusted operating system libraries and third party libraries required in the online environment, for example, asynchronous JavaScript and extensible markup language (AJAX), Adobe Flash® of Adobe Systems Incorporated, etc., within the client application 203.

The network provider loader interception module 218c monitors network providers and detects attempts by unauthorized entities to layer or replace an application code on one or more layers of a network stack of an operating system of the communication device 201, when the network stack is initialized within an environment of the client application 203. The network provider loader interception module 218c bypasses the unauthorized entities and loads authorized network providers on one or more layers of the network stack of the operating system of the communication device 201 within the environment of the client application 203. The network provider loader interception module 218c prevents an unauthorized entity, for example, an unauthorized network provider from inspecting or modifying the flow of information over the network 213. The network provider loader interception module 218c monitors loading of authenticated and validated network providers and components 211 of the operating system of the user's communication device 201.

The network provider loader interception module 218c prevents exposure of the networking layer or the network stack of the operating system to vendors of unauthorized entities that attempt to intercept or manipulate the flow of information, for example, by content filtering, firewall applications, etc. The network provider loader interception module 218c further prevents the vendors of unauthorized entities from replacing or layering their code above or below the networking layers of the user's communication device 201 to inspect or modify the flow of information. In this manner, the network provider loader interception module 218c prevents the capture of user information for malafide intentions or for hijacking a transaction at the networking layer. The network provider loader interception module 218c enumerates through the installed network providers and allows layering within its environment only by the trusted network providers. Furthermore, the network provider loader interception module 218c detects if an operating system provider is replaced by an unauthorized entity and always loads the correct operating system provider in case of any replacement.

On securing the online environment, the security module 207 secures input information acquired from the user. The security module 207 provides a secure method of acquiring input information from the user. The user input protection module 219 of the security module 207 masks input information acquired from the user via an input device, for example, a keyboard, a touchpad, etc., associated with the user's communication device 201 for protecting the input information from being accessed by unauthorized entities. Furthermore, the user input protection module 219 transfers the masked input information through an established secure communication channel to the input device routines of the operating system. In an embodiment, the user input protection module 219 encrypts the input information acquired from the user and transfers the encrypted information via the secure communication channel.

In an embodiment, the user input protection module 219 comprises a keystroke interception module 219a, a rendering engine interception module 219b, and an encryption module 219c. The user input protection module 219 secures input information acquired from the user via an input device, for example, a keyboard of the user's communication device 201. The user provides the input information, for example, by keystrokes. The keystrokes emerge from the keyboard, pass through layers of the operating system of the user's communication device 201, and finally reach a destination application on the user's communication device 201.

The client application 203 places the rendering engine interception module 219b on a rendering engine window procedure of the operating system of the user's communication device 201. For example, in typical operating systems, applications that make use of a display user interface to display content to a user have an associated window procedure to receive keystrokes, inputs from a pointing device such as a mouse, and other events. That is, the display user interface implements the rendering engine window procedure to receive keystrokes, inputs from pointing devices, and other events. In an embodiment, the rendering engine window procedure of the operating system of the user's communication device 201 receives masked keystrokes. The rendering engine interception module 219b intercepts events including the transfer of keystrokes to the rendering engine window procedure. The rendering engine interception module 219b retrieves the original keystrokes from the secure communication channel and passes the original keystrokes to the rendering engine window procedure whenever the rendering engine interception module 219b encounters masked keystrokes during interception of the keystrokes. Therefore, the rendering engine interception module 219b blocks attempts by unauthorized entities to intercept, capture, and modify input information acquired from the user.

In an embodiment, the keystroke interception module 219a intercepts the acquired input information from the user in the form of, for example, keystrokes at the lowest level. The keystroke interception module 219a further masks the keystrokes and transmits the masked keystrokes via a standard keyboard path to the rendering engine interception module 219b. In this manner, the unauthorized entities attempting to access the input information on the standard keyboard path acquire only the masked keystrokes. In another embodiment, the keystroke interception module 219a transmits the real or original keystrokes to the rendering engine interception module 219b via the secure communication channel. The rendering engine interception module 219b substitutes the masked keystrokes with real keystrokes representing the input information provided by the user and delivers the real keystrokes to the rendering engine window procedure of the operating system of the user's communication device 201.

The encryption module 219c protects a communication channel that transfers the input information acquired from the user via an input device, for example, a keyboard associated with the communication device 201, by encrypting the communication channel for securing the transfer of the input information. The encryption module 219c evades any possible attempts by the unauthorized entities to access information exchanged through the secure communication channel. In an embodiment, the encryption module 219c employs the asymmetric encryption method to encrypt input information, for example, keystrokes. The encryption module 219c dynamically generates a key pair comprising the encryption key and the decryption key and passes the decryption key, that is, the private protected key to the rendering engine interception module 219b. The encryption module 219c encrypts the keystrokes acquired from the user using the encryption key and transfers the encrypted keystrokes over the secure communication channel to the rendering engine interception module 219b. The rendering engine interception module 219b decrypts the encrypted keystrokes using the decryption key.

The display content access interception module 216 masks display content or screen content captured from interfaces, for example, display windows, screens, etc., of the client application 203 and the communication device 201. For example, the display content access interception module 216 masks captured screen content of a window of the client application 203 or the desktop screen of the communication device 201. The screen content comprises, for example, screenshots of the display screen of the communication device 201, that display information such as user login credentials and transaction credentials entered by the user, electronic mails viewed by the user, etc. The display content access interception module 216 prevents the unauthorized entities from evading security measures, for example, virtual keyboards, by preventing capture of screen content.

The display content access interception module 216 masks screen content captured on a display screen of the communication device 201, thereby blocking attempts by unauthorized entities to read the captured screen content of the client application 203 while the client application 203 is running or currently active. The display content access interception module 216 prevents reading, accessing, and saving of automatically captured screen content on a clip board by unauthorized entities. The display content access interception module 216 prevents generation of print screen (Prt Scr) keystrokes by unauthorized entities to capture the screen content of a web page with a virtual keyboard viewed through the client application 203. In this manner, the display content access interception module 216 prevents the unauthorized entities from simulating the print screen keystrokes and capturing, for example, a position of a mouse pointer to figure out the keystroke provided by the user.

The networking module 215 validates requests for state information, for example, cookie information, login information, stored passwords, etc., in the online environment, provides one or more databases 215c and 215d that store certificates of multiple validated online portals, for example, trusted websites, in the online environment, and validates and verifies certificates received from a requested online portal with the stored certificates in the databases 215c and 215d. The networking module 215 comprises a hypertext transfer protocol (HTTP) module 215a, a certificate verification module 215b, and one or more databases 215c and 215d.

The hypertext transfer protocol (HTTP) module 215a validates requests for state information in the online environment, prevents attempts by unauthorized entities to intercept the state information or manipulate the information exchanged in the online environment. The HTTP module 215a is integrated with the client application 203. Furthermore, the HTTP module 215a blocks attempts by unauthorized entities to intercept information exchanged with an online portal, for example, a website. The HTTP module 215a is, for example, a customized HTTP library that prevents state information such as cookie information from being accessed by unauthorized entities. The HTTP module 215a validates the application requesting the cookie information, before deciding on whether the cookie information can be forwarded to the requesting application.

The networking module 215 further comprises a state information store 215e for storing state information, for example, session identification information such as cookie information and user identification information such as login information, stored passwords, website preferences of the user, etc. A website places state information, for example, cookies on the state information store 215e and the HTTP module 215a manages information on the cookies during a transaction. Consider an example where the user requests to access a transaction website and provides user credentials. The transaction website authenticates the user and stores the state information as cookies in the state information store 215e. After a successful login, the transaction website uses the cookies in the state information store 215e to identify the user during subsequent transactions.

The HTTP module 215a prevents any unauthorized entity from requesting access to the information on cookies, that is, access to the state information store 215e. In this manner, the HTTP module 215a prevents unauthorized transactions unbeknown to the user. The HTTP module 215a allows the rendering engine 209, trusted extension applications, and authenticated third party applications 214 to request for the cookie information. In an embodiment, information is exchanged over a hypertext transfer protocol secure (https) protocol, that is, over a hypertext transfer protocol connection with the secure sockets layer (SSL) protocol. The SSL protocol provides content integrity, secrecy, and website identity.

The certificate verification module 215b verifies the authenticity of a requested online portal by verifying certificates received from the requested online portal against the stored certificates in the databases 215c and 215d. The certificates are, for example, digitally signed website certificates that validate the authenticity of websites. The client application 203 ensures that the databases 215c and 215d are protected from tampering by unauthorized entities. In an embodiment, the databases 215c and 215d of the client application 203 are digitally signed to detect any unauthorized modification of the databases 215c and 215d, thereby protecting the databases 215c and 215d from tampering. The databases 215c and 215d are, for example, a trusted website certificate database 215c and a trusted root certificate database 215d. The trusted website certificate database 215c stores certificates of multiple validated online portals in the online environment. The validated online portals are, for example, trusted websites. The trusted root certificate database 215d stores certificates of multiple validated certifying authorities (CA) in the online environment. The certificate verification module 215b in addition to performing the standard certificate validation using the trusted root certificate database 215d, can also check the website certificates against the trusted website certificate database 215c to positively identify, for example, transaction websites. This defeats any malicious attempt to steal, for example, a user's personal information, banking credentials, etc., by presenting a fake certificate or by manipulating the trusted root certificate database 215d. The certificate verification module 215b allows an encryption key to be exchanged with a website, thereby ensuring that all communication with the website is encrypted and secured over the network 213, for example, the internet.

The secure domain name system (DNS) server 212 of the computer implemented system 200 disclosed herein, in communication with a redirection safeguard module 217 of the security module 207 of the client application 203, bypasses a default configured domain name system for preventing redirection from a requested online destination to one or more unauthorized entities, for example, harmful websites in the online environment. The secure DNS server 212 communicates with the redirection safeguard module 217 via the network 213. The secure DNS server 212 in communication with the redirection safeguard module 217 performs a secure domain name resolution procedure for translating domain names to internet protocol (IP) addresses.

The redirection safeguard module 217 of the security module 207 evades the unauthorized entities that modify contents of the DNS resolver cache and the local host files on the user's communication device 201. The redirection safeguard module 217 also evades the unauthorized entities that intercept the name resolution lookups and point to the unauthorized entities, for example, malicious websites. The redirection safeguard module 217 prevents the unauthorized entities from blocking security measures. For example, the redirection safeguard module 217 prevents the unauthorized entities from blocking signature file updates, evading detection, hijacking domain name system (DNS) servers, and domain name system (DNS) poisoning.

The redirection safeguard module 217 bypasses the local host file and the local domain name system (DNS) resolver cache while performing name resolution lookups. In an embodiment, the redirection safeguard module 217 locally maintains a cache of valid hostnames to internet protocol (IP) addresses mapping. The redirection safeguard module 217 contacts the secure DNS server 212 in case the redirection safeguard module 217 is unable to resolve the IP addresses of the requested online destination.

The secure domain name system (DNS) server 212 bypasses the default configured DNS servers. The secure DNS server 212 stores a complete list of valid DNS records comprising, for example, internet protocol (IP) addresses of valid web servers that host websites. The communication between the redirection safeguard module 217 and the secure DNS server 212 is secured by ensuring integrity and authenticity of the name resolution lookup. In an embodiment, the DNS resolutions returned by the secure DNS server 212 are digitally signed in compliance with domain name system security extensions (DNSSEC) to enable the redirection safeguard module 217 to verify the authenticity of the DNS name resolution response from the secure DNS server 212.

Consider an example in which the user requests and accesses a web page of a transaction website using the client application 203 on the user's communication device 201. The rendering engine 209 of the client application 203 fetches the requested web page via the redirection safeguard module 217. The redirection safeguard module 217 resolves the web page name from the domain name address into the IP address, for example, 74.208.45.54 using the secure domain name system (DNS) server 212. The certificate verification module 215b verifies the certificates of the web page with a list of certificates available in the trusted root certificate database 215d and the trusted website certificate database 215c. The security module 207 downloads the requested web page and provides security for downloading the web page. The rendering engine 209 displays the downloaded web page within the client application 203. The security module 207 protects information and resources being processed, exchanged, stored, and displayed within the client application 203. For example, the security module 207 protects input information entered by the user, state information exchanged with the transaction website, etc.

The browser redirection module 208 of the client application 203 continuously monitors activities performed by the user in the online environment for alerting the user to manually invoke the client application 203 or for automatically invoking the client application 203 for protecting the information and the resources being processed, exchanged, stored, and displayed in the online environment. In an embodiment, the browser redirection module 208 monitors the access of a transaction website in the online environment by the user. The browser redirection module 208 redirects the user to the client application 203 if the user tries to access the transaction website. The user can then navigate to the transaction website within the client application 203.

In an embodiment, the client application 203 further comprises a notification module 210, as exemplarily illustrated in FIG. 2A, for sending notifications to the user such as messages stating that a downloaded application has failed the code signing check, a website is no longer valid since the website certificate has expired, etc. In an example, if a website is deemed malicious, the notification module 210 triggers a pop-up window displaying information that the website attempted to access personal information of the user.

Figure 3:
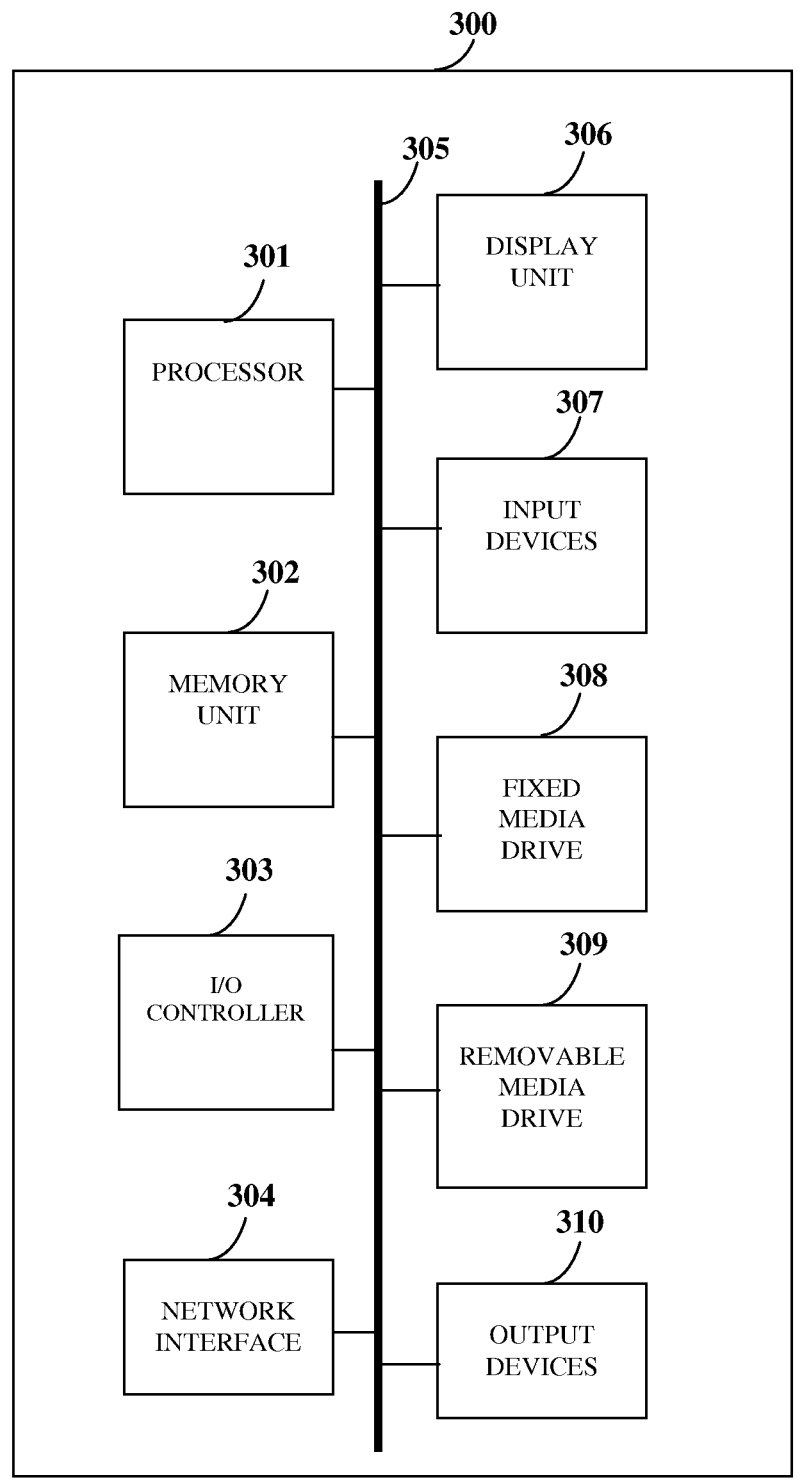
FIG. 3 exemplarily illustrates the architecture of a computer system employed by a client application for protecting information and resources in an online environment.

FIG. 3 exemplarily illustrates the architecture of a computer system 300 employed by a client application 203 for protecting information and resources in an online environment. The process initialization monitor application 202, the client application 203, and the secure domain name system (DNS) server 212 of the computer implemented system 200 disclosed herein exemplarily illustrated in FIG. 2A, employ the architecture of the computer system 300 exemplarily illustrated in FIG. 3.

The client application 203 communicates with the secure domain name system (DNS) server 212 in an online environment via a network 213, for example, a short range network or a long range network. The network 213 is, for example, the internet, a local area network, a wide area network, a mobile communication network, etc. The computer system 300 comprises, for example, a processor 301, a memory unit 302 for storing programs and data, an input/output (I/O) controller 303, a network interface 304, a data bus 305, a display unit 306, input devices 307, a fixed media drive 308, a removable media drive 309 for receiving removable media, output devices 310, etc.

The processor 301 is an electronic circuit that executes computer programs. The memory unit 302 is used for storing programs, applications, and data. For example, the library loading monitoring module 202a, the process access interception module 202b, and the thread access interception module 202c of the process initialization monitor application 202 are stored in the memory unit 302 of the computer system 300. In another example, the component identification module 204, the authentication module 205, the access control module 206, the security module 207, the browser redirection module 208, the notification module 210, etc., of the client application 203 are stored in the memory unit 302 of the computer system 300. The memory unit 302 is, for example, a random access memory (RAM) or another type of dynamic storage device that stores information and instructions for execution by the processor 301. The memory unit 302 also stores temporary variables and other intermediate information used during execution of the instructions by the processor 301. The computer system 300 further comprises a read only memory (ROM) or another type of static storage device that stores static information and instructions for the processor 301. The network interface 304 enables connection of the computer system 300 to the network 213. For example, the user's communication device 201 and the secure domain name system (DNS) server 212 connect to the network 213 via their respective network interfaces 304. The network interface 304 comprises, for example, an infrared (IR) interface, a WiFi interface, a universal serial bus (USB) interface, a local area network (LAN) interface, a wide area network (WAN) interface, etc.

The I/O controller 303 controls the input and output actions performed by the user using the communication device 201. The data bus 305 permits communications between the modules 202a, 202b, and 202c of the process initialization monitor application 202 and the modules 204, 205, 206, 207, 208, 209, 210, 215, 216, 217, 218, 219, etc., of the client application 203, and further, internally between the modules 204, 205, 206, 207, 208, 209, 210, 215, 216, 217, 218, 219, etc., of the client application 203 on the user's communication device 201.

The display unit 306 displays content of the allowed and authenticated online portals, for example, the content of web pages of a trusted website viewed by the user via the client application 203. The rendering engine 209 of the client application 203 interfaces with the display unit 306 for displaying formatted content. The input devices 307 are used for inputting data into the computer system 300. For example, the client application 203 is manually invoked by the user using one or more of the input devices 307. Furthermore, the client application 203 acquires input information such as login details for a transaction website from the user via one or more of input devices 307. The input devices 307 are, for example, a keyboard such as an alphanumeric keyboard, a joystick, a mouse, a touch pad, a light pen, etc. The output devices 310 output the results of the actions performed by the process initialization monitor application 202 and the client application 203. For example, the notification module 210 of the client application 203 defined instructions for sending notifications to the user such as messages stating that a downloaded application has failed the code signing check, a website is no longer valid since the website certificate has expired, etc., through an output device 310 such as a display screen. In another example, if a website is deemed malicious, the notification module 210 defines instructions for triggering a pop-up window on the display screen displaying information that the website attempted to access personal information of the user 301.

Computer applications and programs are used for operating the computer system 300. The programs are loaded onto the fixed media drive 308 and into the memory unit 302 of the computer system 300 via the removable media drive 309. In an embodiment, the computer applications and programs may be loaded directly via the network 213. Computer applications and programs are executed by double clicking a related icon displayed on the display unit 306 using one of the input devices 307.

The computer system 300 employs an operating system for performing multiple tasks. The operating system is responsible for management and coordination of activities and sharing of resources of the computer system 300. The operating system further manages security of the computer system 300, peripheral devices connected to the computer system 300, and network connections. The operating system creates processes and threads for the client application 203 and initializes memory for the client application 203 during process initialization. The operating system recognizes and permits the client application 203, for example, to intercept and verify authenticity of libraries being requested by an application, to block alternate code paths for applications, to mask and redirect input information such as keystroke information to a different memory location to protect input information from keystroke logging malware, etc. In an example, the operating system allows the client application 203 to insert a keystroke interception routine of the keystroke interception module 219a on a standard keyboard routine within the operating system to allow masking of keystrokes for protection from malware.

The operating system employed on the computer system 300 recognizes, for example, inputs provided by the user using one of the input devices 307, the output display, files, and directories stored locally on the fixed media drive 308, for example, a hard drive. The operating system on the computer system 300 executes different programs using the processor 301. The processor 301 retrieves the instructions for executing the modules, for example, 202a, 202b, and 202c of the process initialization monitor application 202 from the program memory. The processor 301 also retrieves the instructions for executing the modules, for example, 204, 205, 206, 207, 208, 209, 210, 215, 216, 217, 218, 219, etc., of the client application 203 from the program memory. A program counter determines the location of the instructions in the program memory. The program counter stores a number that identifies the current position in the program of the modules, for example, 202a, 202b, and 202c of the process initialization monitor application 202 and the modules, for example, 204, 205, 206, 207, 208, 209, 210, 215, 216, 217, 218, 219, etc., of the client application 203.

The instructions fetched by the processor 301 from the program memory after being processed are decoded. The instructions are placed in an instruction register in the processor 301. After processing and decoding, the processor 301 executes the instructions. For example, the process initialization monitor application 202 defines instructions for monitoring process initialization of the client application 203. The library loading monitoring module 202a of the process initialization monitor application 202 defines instructions for allowing loading of components 211, for example, standard required operating system libraries of the user's communication device 201, blocking attempts to load other unauthenticated components, for example, malicious libraries invoked by unauthorized entities, preventing unauthorized entities from injecting code, intercepting library calls, and executing alternate code paths, etc., thereby ensuring that only standard process initialization occurs. The process access interception module 202b and the thread access interception module 202c of the process initialization monitor application 202 define instructions for monitoring requests of one or more components 211 and one or more third party applications 214 to access processes and threads of the client application 203 respectively, and for blocking attempts by unauthorized entities to access the processes and the threads of the client application 203. The process access interception module 202b and the thread access interception module 202c also define instructions for automatically altering access permissions of unauthorized entities for preventing modification of memory content and execution of alternate code paths of the client application 203 by the unauthorized entities. The process access interception module 202b and the thread access interception module 202c also define instructions for prohibiting access of the memory content to the unauthorized entities and manipulation of code and data of the client application 203 by the unauthorized entities.

The component identification module 204 of the client application 203 defines instructions for identifying one or more components 211 operating on the communication device 201 and one or more third party applications 214 attempting to access the client application 203 when the user performs activities in an online environment. The authentication module 205 of the client application 203 defines instructions for authenticating the components 211 of the communication device 201 and the third party applications 214. For example, the code integrity check module 205a of the authentication module 205 defines instructions for authenticating multiple components 211 such as library components and third party applications 214, independent of the communication device 201, by performing a code integrity and publisher check using digital certificates. The access control module 206 of the client application 203 defines instructions for granting access to authenticated components 211 and authenticated third party applications 214 based on inputs received from the authentication module 205.

The security module 207 defines instructions for protecting information being processed, exchanged, stored, and displayed within the client application 203. For example, the user input protection module 219 of the security module 207 defines instructions for protecting input information acquired from a user from being accessed by unauthorized entities. The user input protection module 219 defines instructions for masking input information acquired from the user via an input device 307 associated with the communication device 201, transferring the masked information through the established communication channel, and transferring original input information through an encrypted communication channel. The display content access interception module 216 of the security module 207 defines instructions for masking display content captured from the interfaces of the client application 203 and the communication device 201. The encryption module 219c defines instructions for encrypting a communication channel that transfers input information acquired from the user for securing the transfer of the input information.

The blocking module 218 of the security module 207 defines instructions for blocking attempts to monitor, intercept, and manipulate user information and system information by unauthorized entities, and for preventing access of certificates, resources of the client application 203, and input information and system information by the unauthorized entities in the online environment. For example, the library loader interception module 218b of the blocking module 218 defines instructions for monitoring access requests to load library components during the performance of activities by the user in the online environment. The object loader interception module 218a of the blocking module 218 defines instructions for monitoring access to objects that expose services in the online environment and for ensuring loading of authenticated original component services exposed by the objects. The network provider loader interception module 218c of the blocking module 218 defines instructions for monitoring network providers and detects attempts by unauthorized entities to layer or replace an application code on one or more layers of a network stack of an operating system of the communication device 201, when the network stack is initialized within an environment of the client application 203. The network provider loader interception module 218c defines instructions for bypassing the unauthorized entities and loading authorized network providers on one or more layers of the network stack of the operating system of the communication device 201 within the environment of the client application 203.

The networking module 215 defines instructions for validating requests for state information and validating online portals in the online environment. For example, the hypertext transfer protocol (HTTP) module 215a of the networking module 215 defines instructions for validating requests for state information in the online environment, preventing attempts by unauthorized entities to intercept the state information or manipulate the information exchanged in the online environment. The certificate verification module 215b of the networking module 215 defines instructions for verifying authenticity of a requested online portal by verifying certificates received from the requested online portal against the stored certificates in one or more databases 215c and 215d.

The redirection safeguard module 217 of the security module 207 defines instructions for preventing redirection from a requested online destination to one or more unauthorized entities, for example, by performing a secure domain name resolution procedure in communication with the secure domain name system (DNS) server 212. The browser redirection module 208 defines instructions for continuously monitoring activities performed by the user in the online environment for alerting the user to manually invoke the client application 203 or for automatically invoking the client application 203 for protecting information being processed, exchanged, stored, and displayed in the online environment.

The processor 301 of the computer system 300 employed by the process initialization monitor application 202 retrieves the instructions defined by the library loading monitoring module 202a, the process access interception module 202b, and the thread access interception module 202c and executes the instructions. The processor 301 of the computer system 300 employed by the client application 203 retrieves the instructions defined by the component identification module 204, the authentication module 205, the code integrity check module 205a, the access control module 206, the security module 207, the browser redirection module 208, the notification module 210, the networking module 215, the display content access interception module 216, the redirection safeguard module 217, the blocking module 218, the user input protection module 219, etc., and executes the instructions. The processor 301 of the computer system 300 employed by the secure domain name system (DNS) server 212 retrieves instructions from the redirection safeguard module 217 of the client application 203 via the network 213 and executes the instructions.

At the time of execution, the instructions stored in the instruction register are examined to determine the operations to be performed. The processor 301 then performs the specified operations. The operations include arithmetic and logic operations. The operating system performs multiple routines for performing a number of tasks required to assign the input devices 307, the output devices 310, and memory for execution of the modules, for example, 202a, 202b, and 202c of the process initialization monitor application 202, and the modules, for example, 204, 205a, 206, 207, 208, 209, 210, 215, 216, 217, 218, 219, etc., of the client application 203. The tasks performed by the operating system comprise assigning memory to the modules, for example, 202a, 202b, and 202c of the process initialization monitor application 202 and to the modules, for example, 204, 205a, 206, 207, 208, 209, 210, 215, 216, 217, 218, 219, etc., of the client application 203, and to data used by the process initialization monitor application 202 and the client application 203, moving data between the memory unit 302 and disk units, and handling input/output operations. The operating system performs the tasks on request by the operations and after performing the tasks, the operating system transfers the execution control back to the processor 301. The processor 301 continues the execution to obtain one or more outputs. The outputs of the execution of the modules, for example, 202a, 202b, and 202c of the process initialization monitor application 202 and the modules, for example, 204, 205a, 206, 207, 208, 209, 210, 215, 216, 217, 218, 219, etc., of the client application 203 are displayed to the user.

Disclosed herein is also a computer program product comprising computer executable instructions embodied in a non-transitory computer readable storage medium. As used herein, the term "non-transitory computer readable storage medium" refers to all computer readable media, for example, non-volatile media such as optical disks or magnetic disks, volatile media such as a register memory, a processor cache, etc., and transmission media such as wires that constitute a system bus coupled to the processor 301, except for a transitory, propagating signal.

The computer program product disclosed herein comprises multiple computer program codes for protecting information and resources in an online environment. For example, the computer program product disclosed herein comprises a first computer program code for monitoring process initialization of the client application 203 on the user's communication device 201; a second computer program code for identifying one or more components 211 operating on the communication device 201 and one or more third party applications 214 attempting to access the client application 203 during performance of activities by the user in the online environment; a third computer program code for authenticating the components 211 of the communication device 201 and the third party applications 214, and for executing and granting access to the authenticated components 211 and the authenticated third party applications 214, wherein the authentication is performed by a code signing check integrated in the client application 203 independent of the communication device 201; and a fourth computer program code for protecting information and resources being processed, exchanged, stored, and displayed within the client application 203.

The computer program product disclosed herein further comprises a fifth computer program code for masking input information acquired from the user via an input device 307 associated with the communication device 201 for protecting the input information from being accessed by unauthorized entities; a sixth computer program code for masking display content captured from the interfaces of the client application 203 and the communication device 201; a seventh computer program code for encrypting a communication channel that transfers the input information acquired from the user via an input device 307 associated with the communication device 201, for securing the transfer of the input information; an eighth computer program code for blocking attempts to monitor, intercept, and manipulate the information being processed, exchanged, stored, and displayed within the client application 203 and for preventing access of certificates, resources of the client application 203, and the information by the unauthorized entities in the online environment; and a ninth computer program code for preventing redirection from a requested online destination to one or more unauthorized entities in the online environment.

The computer program product disclosed herein further comprises a tenth computer program code for continuously monitoring activities performed by the user in the online environment for alerting the user to manually invoke the client application 203 for protecting information and resources being processed, exchanged, stored, and displayed within the client application 203 or for automatically invoking the client application 203 for protecting information and resources being processed, exchanged, stored, and displayed within the client application 203 in the online environment; an eleventh computer program code for monitoring network providers for detecting attempts by unauthorized entities to layer or replace an application code on one or more layers of a network stack of an operating system of the communication device 201, when the network stack is initialized in the environment of the client application 203, for bypassing the unauthorized entities, and for loading authorized network providers on one or more layers of the network stack, within the environment of the client application 203; and a twelfth computer program code for monitoring access to objects that expose services in the online environment, and for ensuring loading of authenticated original component services exposed by the objects. The computer program product disclosed herein further comprises additional computer program codes for performing additional steps that may be required and contemplated for protecting information and resources in the online environment.

The computer program codes comprising the computer executable instructions are embodied on the non-transitory computer readable storage medium. The processor 301 of the computer system 300 retrieves these computer executable instructions and executes them. When the computer executable instructions are executed by the processor 301, the computer executable instructions cause the processor 301 to perform the method steps for protecting information and resources in the online environment. In an embodiment, a single piece of computer program code comprising computer executable instructions performs one or more steps of the computer implemented method disclosed herein for protecting information and resources in an online environment.

For purposes of illustration, the detailed description refers to the process initialization monitor application 202 and the client application 203 being run locally on a computer system 300; however the scope of the computer implemented method and system 200 disclosed herein is not limited to the process initialization monitor application 202 and the client application 203 being run locally on the computer system 300 via the operating system and the processor 301, but may be extended to run remotely over the network 213, for example, by employing a web browser and a remote server, a mobile phone, or other electronic devices.

Figure 4:
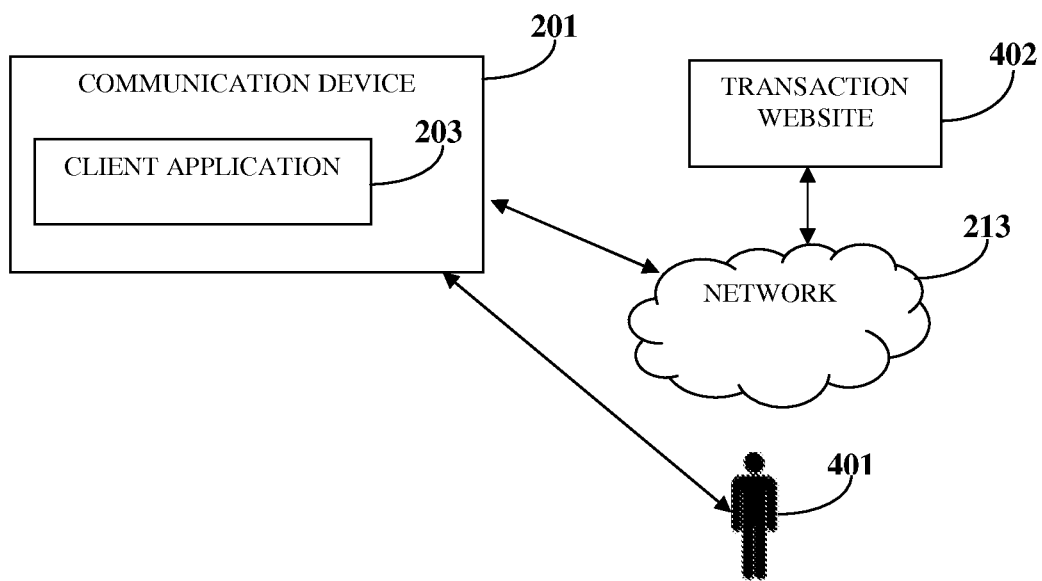
FIG. 4 exemplarily illustrates communication between the client application provided on a communication device of a user and a transaction website in an online environment, when the user performs online transactions.

FIG. 4 exemplarily illustrates communication between the client application 203 provided on a communication device 201 of a user 401 and a transaction website 402 in an online environment, when the user 401 performs online transactions. The user 401 uses the communication device 201 to connect to an online portal, for example, a transaction website 402 via the network 213. The user 401 can access a secure transaction website 402, for example, an electronic commerce (ecommerce) website, a stock brokerage website, an electronic mail (email) website, a financial website, any website that requires the user's 401 personal information or allows the user 401 conduct online financial transactions, etc., via the client application 203. The client application 203 acts as an interface between the user 401 and the transaction website 402.

The user 401 invokes the client application 203, for example, for accessing a transaction website 402. The user 401 logs into the transaction website 402 and provides input information, for example, the user's 401 login credentials, etc., to the client application 203. The client application 203 protects the input information entered by the user 401. For example, as disclosed in the detailed description of FIGS. 2A-2B, the user input protection module 219 of the security module 207 of the client application 203 protects the user's 401 input information, for example, from key logging. The client application 203 also ensures that the user 401 is interacting with a legitimate transaction website 402 and protects the information exchanged between the user 401 and the transaction website 402 via the client application 203. The client application 203 authenticates and grants access to the authenticated and validated components 211 and the authenticated third party applications 214, while the user 401 performs activities in the online environment. The client application 203 protects the user's 401 input information and enables secure online transactions between the user 401 and the transaction website 402.

Figure 5:
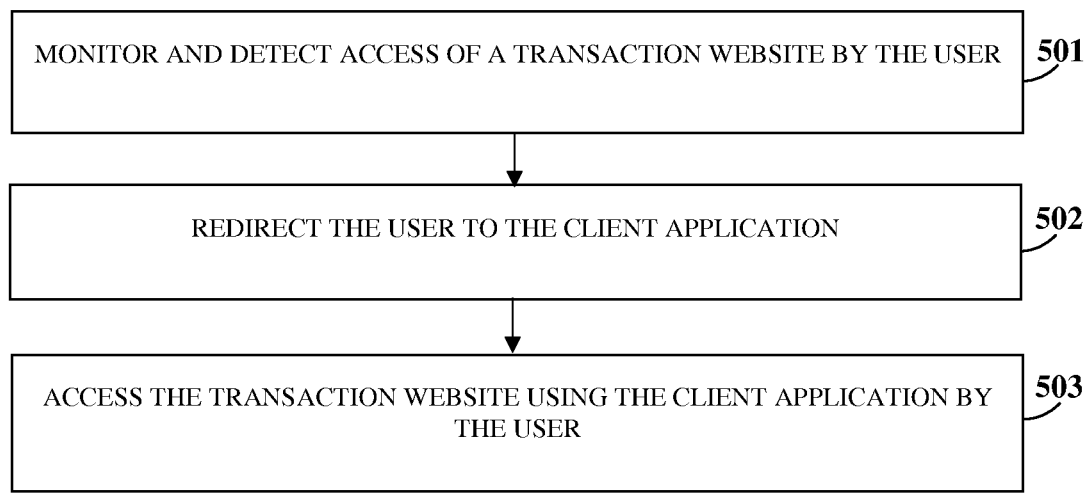
FIG. 5 exemplarily illustrates a flow diagram comprising the steps for protecting information provided by a user during online transactions.

FIG. 5 exemplarily illustrates a flow diagram comprising the steps for protecting information provided by a user 401 during online transactions. The user 401 may access a transaction website 402, as exemplarily illustrated in FIG. 4, using a browsing application or any other software application on the user's 401 communication device 201. For example, the user 401 may use a web browser for accessing a transaction website 402. The client application 203 monitors the activities performed by the user 401 in the online environment to determine whether the user 401 is accessing a website, for example, a transaction website 402 that involves personal information exchange or online transactions using the default web browser. The client application 203 monitors and detects 501 access of the transaction website 402 by the user 401. The user 401 is redirected 502 to the client application 203 if the user 401 accesses a transaction website 402 that involves personal information exchange or online transactions using the default web browser. The client application 203 may prompt the user 401 before redirecting to the client application 203. The user 401 can then access 503 the transaction website 402 securely using the client application 203 and securely complete the transaction.

Figure 6A:
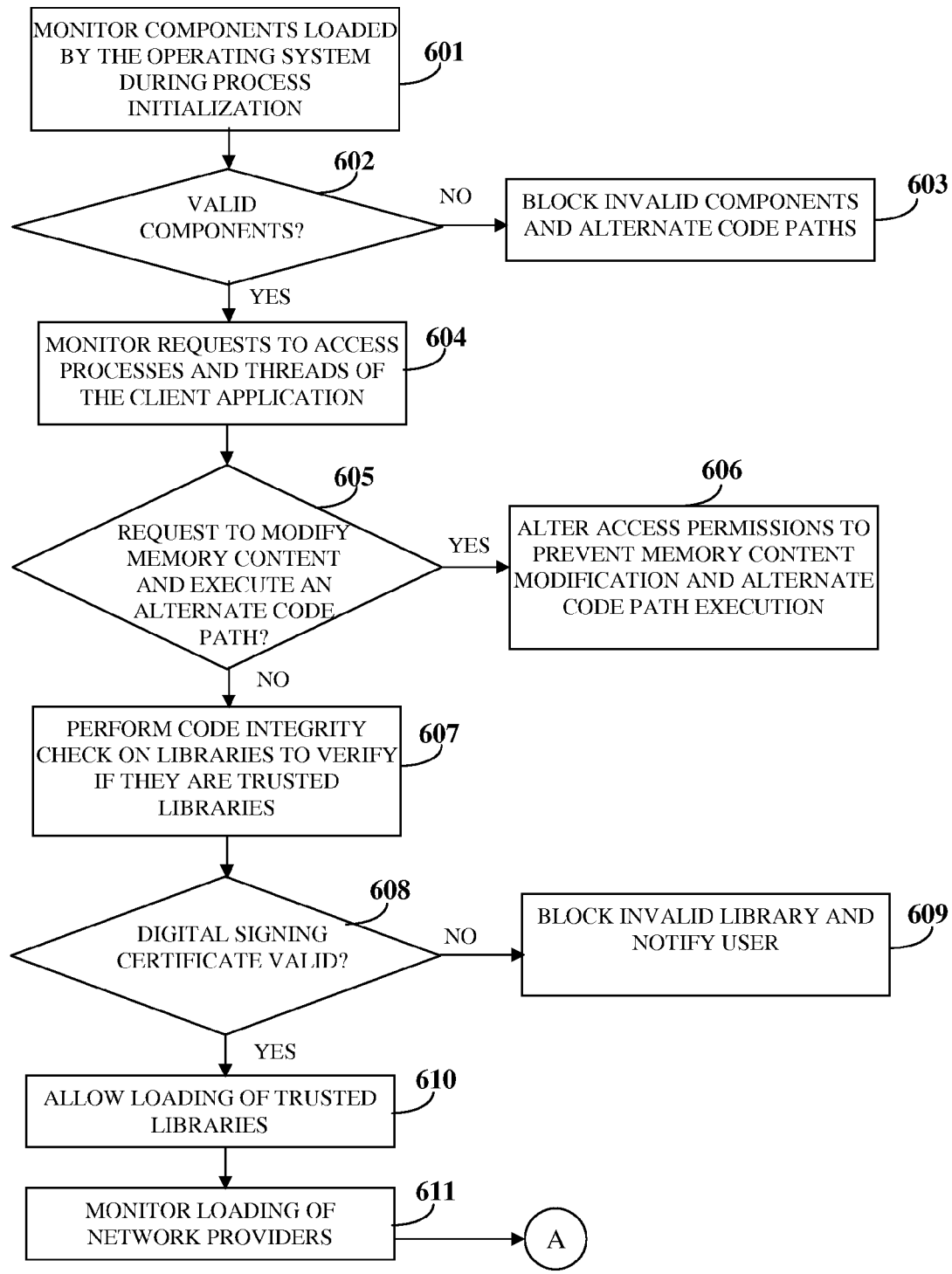
FIGS. 6A-6C exemplarily illustrate a flowchart comprising the steps for protecting information provided by a user during online transactions.
Figure 6B:
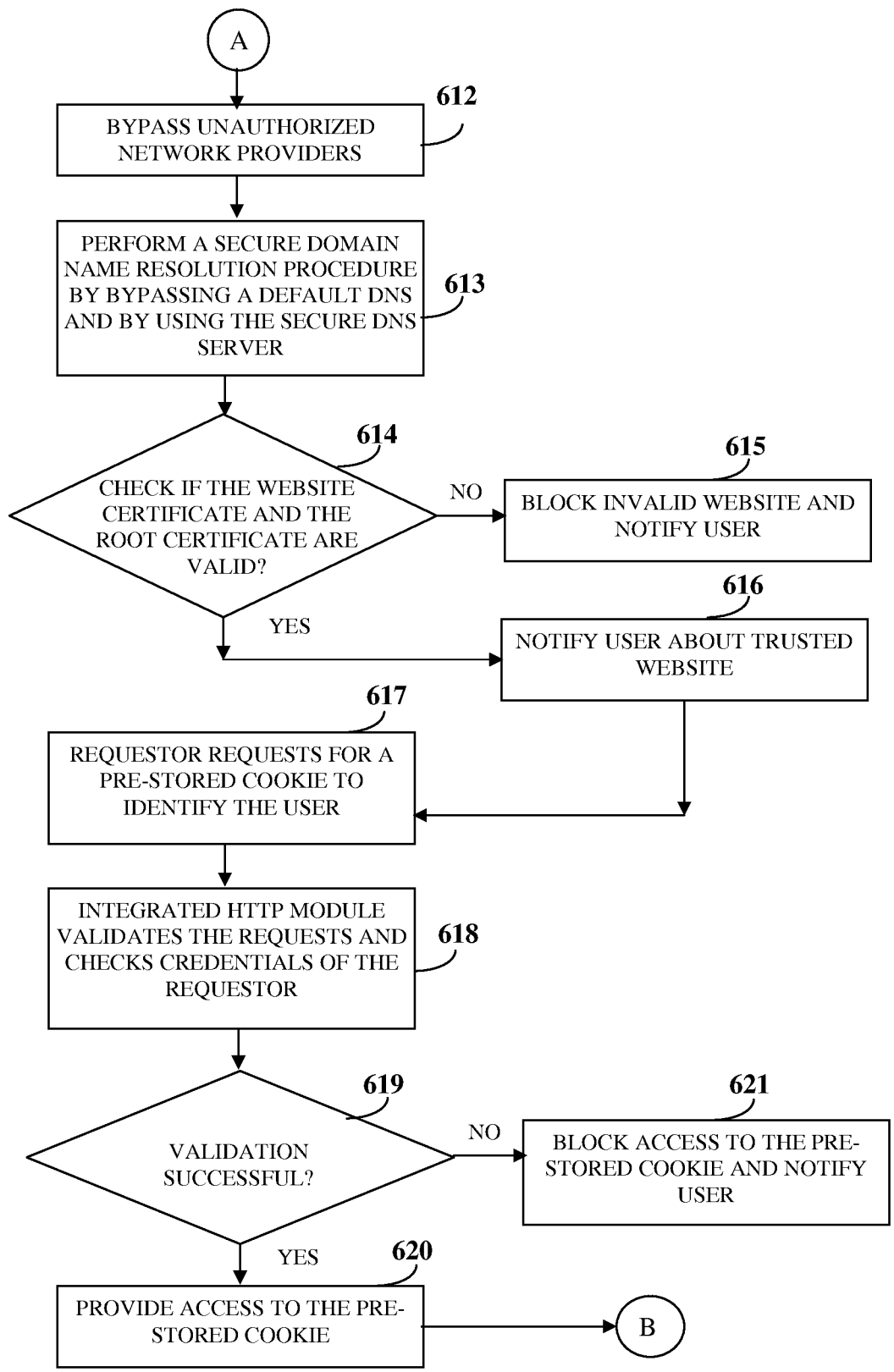
Figure 6C:
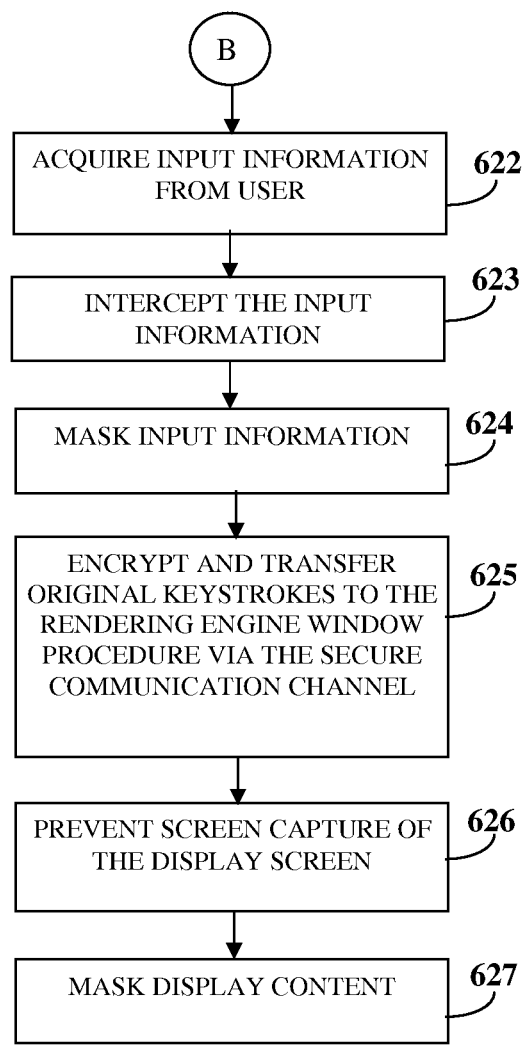

FIGS. 6A-6C exemplarily illustrate a flowchart comprising the steps for protecting information provided by a user 401 during online transactions. Consider an example of a user 401 who wishes to conduct a secure transaction with an online portal, for example, an online banking website, using a communication device 201 such as an internet-enabled mobile phone. An unauthorized entity may reside on the user's 401 communication device 201 that attempts to capture and manipulate transaction information exchanged by the user 401 with the online banking website. The unauthorized entity is, for example, a malware that is designed with multiple capabilities to attack weaknesses in the operating system architecture, browser architecture, etc., and perform unauthorized operations to compromise the security of user information and system information.

The user 401 connects to a network 213, for example, the internet and invokes the client application 203 on the user's 401 communication device 201 as exemplarily illustrated in FIG. 2A and FIG. 4. An operating system on the communication device 201 of the user 401 initializes a process for the start-up of the client application 203 on the communication device 201. The process initialization monitor application 202 monitors the process initialization of the client application 203 on the user's 401 communication device 201. The process initialization monitor application 202 monitors 601 the components 211 loaded by the operating system during the process initialization of the client application 203.

The process initialization monitor application 202 checks 602 the validity of the components 211 loaded during the process initialization of the client application 203. The components 211 are, for example, the operating system libraries that need to be accessed for initializing a process for the start-up of the client application 203. If the components 211 are found to be invalid, the process initialization monitor application 202 blocks 603 the invalid components and alternate code paths inserted by the malware. The process initialization monitor application 202 blocks all components 211 other than the standard operating system libraries needed for the initialization of the client application 203 and the libraries which are to be accessed by the client application 203. The malware may attempt to modify an entry point of a library function call and replace the calling function with a function to load the library of the malware. The client application 203 blocks a malicious library "mallib.dll" that the malware attempts to load. Furthermore, the client application 203 blocks attempts to execute an alternate code path in the client application 203 to redirect the user 401 to an application code of the malware and prevents attempts by the malware to inject spurious code in the application code of the client application 203.

The process initialization monitor application 202 continuously monitors 604 the requests made by third party applications 214 to access the processes and threads of the client application 203 during the process initialization of the client application 203. The process initialization monitor application 202 checks 605 if a malware has initiated a request to access the processes and the threads of the client application 203 to modify the memory content of the client application 203 and execute an alternate code path within the client application 203.

Consider an example where the malware attempts to access and modify a memory block of a thread, for example, thread-1 of the client application 203 to redirect the user 401 to the malicious code of the malware by inserting an alternate code path. The memory block, for example, stores application code to prevent key logging. The malware may attempt to corrupt the application code that prevents key logging and further redirect the client application 203 by changing pointer addresses at specific points in the application code. To achieve this, the malware places a request to access thread-1 of the client application 203. On detecting this request, the process initialization monitor application 202 alters 606 the access permissions of the malware to prevent memory content modification and alternate code path execution. For example, the process initialization monitor application 202 blocks the malware and disables the read, write and modify permissions of the malware to prevent modification of the memory content and execution of the alternate code paths. When the process initialization has completed successfully, the operating system on the communication device 201, in communication with the process initialization monitor application 202, transfers control to the application code of the client application 203.

The client application 203 monitors the load library requests initiated during the execution of the client application 203 when the user 401 performs an online activity. Consider an example where the user 401 enters into an online game in the online environment. The application executing the online game is, for example, a disguised malware and the malware attempts to install a malicious library "mallib2.dll" on the communication device 201 and access the malicious library "mallib2.dll". The client application 203 performs 607 a code integrity check on all requested libraries to verify if the libraries can be trusted. For example, the client application 203 checks 608 if the digital signing certificate of the requested library is valid. If the digital signing certificate is found valid, then the client application 203 allows 610 loading of the requested library. If the digital signing certificate is found invalid, the client application 203 blocks 609 the invalid library and notifies the user 401 that a malware was attempting to access the invalid library. In this example, the client application 203 performs the code integrity check on the malicious library "mallib2.dll" and determines that the publisher of the application code of the requested library cannot be trusted. Further, the client application 203 verifies that the requested library is not a trusted operating system library and blocks loading of the malicious library "mallib2.dll" requested by the malware.

Consider another example where the user 401 clicks on a link to a movie website. The movie website attempts to access a library that is neither a trusted operating system library nor a trusted extension such as an asynchronous JavaScript and extensible markup language (AJAX) library, Adobe Flash® Player active template library of Adobe Systems Incorporated, etc. The client application 203 checks the code integrity of the library being requested by the movie website and blocks the libraries and application extensions requested by the movie website.

Further, the network provider loader interception module 218c of the client application 203 monitors 611 the loading of network providers and bypasses 612 unauthorized network providers that attempt to intercept the flow of information over the network 213. Consider an example where the user 401 uses a default browser that allows third party code for content filtering to control access to web content. The browser is configured to control access, for example, to restricted movie websites considered inappropriate for children. The browser allows application code installed on the network stack of the operating system to monitor content of the restricted movie website. The malware attempts to exploit this inherent functionality in the browser to add application code above one or more layers of the network stack of the operating system. The client application 203 detects the malware attempting to layer the application code layered above or below the network stack of the operating system, bypasses the malware, and loads only authorized network providers on the layers of the network stack.

Consider an example where the user 401 connects to an online portal over the network 213, for example, the internet. The online portal is, for example, an online banking website. The malware alters the internet protocol (IP) addresses corresponding to domain names of cached websites in the local host file maintained by the operating system to redirect the user 401 to a harmful website. For example, the malware attempts to redirect the user 401 to a fraudulent banking website and capture personal information of the user 401 comprising the electronic mail (email) identity of the user 401 and details of a banking account of the user 401 such as a banking account number, account balance, a credit card number, password, etc. Further, the malware attempts to mislead the user 401 by sending an electronic mail to the user 401 with a hyperlink that suggests that the user 401 is transferred to a trusted banking website while the malware actually redirects the user 401 to the fraudulent banking website. The malware also attempts to lodge on a transmission control protocol/internet protocol (TCP/IP) stack and intercept all name resolution requests transferred by the network stack of the operating system on the communication device 201.

The client application 203 averts this problem by conducting a domain name system (DNS) procedure independently without using the local host file and the default domain name system (DNS). The client application 203 performs 613 a secure domain name resolution procedure by bypassing the default DNS and by using the secure DNS server 212 provided by the computer implemented system 200 separately, that is protected from tampering by the malware. The client application 203 maintains a local resolver cache secured from tampering that performs the secure domain name resolution procedure. If the client application 203 is unable to resolve the internet protocol (IP) address of a web hosting server, the client application 203 contacts the secure DNS server 212 for resolving the IP address of the online banking website. The client application 203 performs the secure domain name resolution procedure by comparing the IP address of the requested online destination with the trusted secure DNS server 212. In an embodiment, the DNS resolutions returned by the secure DNS server 212 are digitally signed to enable the client application 203 to verify the authenticity of the DNS resolution response received from the secure DNS server 212.

Consider an example where the user 401 attempts to access an online portal, for example, an online banking website. The client application 203 checks 614 the validity of the website certificate and the root certificate of the requested online portal. The client application 203 receives the digital certificates that specify the online portal's credentials from the requested online portal, for example, over the secure sockets layer (SSL) protocol. The client application 203 compares the digital certificates of the requested online portal with the trusted databases 215c and 215d provided by the client application 203. In an embodiment, the client application 203 employs digital signing of the databases 215c and 215d to protect the databases 215c and 215d from tampering. Furthermore, the client application 203 verifies the credentials of the certifying authority (CA) that authorizes the website certificate, by comparing the root certificate of the CA with the trusted root certificate database 215d. If the certificates are invalid, the client application 203 blocks 615 the invalid website or the fraudulent banking website and notifies the user 401 that the fraudulent banking website cannot be trusted. If the certificates are valid, the client application 203 notifies 616 the user 401 that the online banking website can be trusted. The user 401 and the online banking website exchange a secure key using the SSL protocol for encrypting communication and transferring transaction information over the network 213.

Consider another example where the malware attempts to steal cookie information exchanged by the user 401 with a valid online portal. An requestor, for example, a social networking website, requests 617 for a pre-stored cookie to identify the user 401. The cookie information comprises, for example, the user login information, password, electronic mail identification of the user 401, etc. The malware may also request for the pre-stored cookie to hijack the session and additionally capture information on, for example, the browsing habits of the user 401. The client application 203 uses a hypertext transfer protocol (HTTP) module 215a, integrated with the client application 203 to validate 618 requests for the pre-stored cookie in the online environment and check the credentials of the requestor that requests for the pre-stored cookie. For example, the HTTP module 215a is a customized HTTP library that employs the secure sockets layer (SSL) protocol, in case of a hypertext transfer protocol secure (https) protocol, to validate the requestor and establish an encrypted connection with a valid requestor. The https protocol ensures that all the data transmitted over the network 213 is encrypted. The client application 203 checks 619 if the requestor of the cookie information is valid. If the HTTP module 215a of the client application 203 establishes that the requestor, for example, the social networking website is valid, the client application 203 provides 620 access of the pre-stored cookie to the social networking website. If the HTTP module 215a of the client application 203 establishes that the requestor attempting to access the cookie is a malware and therefore invalid, the client application 203 blocks 621 access to the pre-stored cookie and notifies the user 401.

Consider an example where the user 401 wants to transfer a sum of money towards mobile payment charges and wants to check the details of the user's 401 online banking account. The user 401 logs in to an online banking website and provides the internet personal identification number (IPIN) and the electronic mail identity of the user 401. The malware attempts to covertly record the user's 401 keystrokes when the user 401 types in information, for example, the user's 401 bank account number, a credit card number, and a password or personal identification number (PIN) through a keypad. If the user 401 uses a virtual keypad, the malware attempts to record the cursor movements of the user's 401 pointing device on the display screen. The malware may also attempt to intercept the user's 401 keystrokes by lodging its application code at a code layer above the keyboard driver. The client application 203 blocks the interception of the input information entered through the keypad or displayed on the display screen of the communication device 201. The client application 203 acquires 622 the input information from the user 401 entered via an input device 307, for example, a keypad of the communication device 201. The client application 203 intercepts 623 the input information entered through a keypad, for example, the user inputted keystrokes, and directs the acquired input information through an encrypted communication channel.

The client application 203 may also mask 624 the input information, for example, the keystrokes entered by the user 401. For example, when the user 401 enters a banking account number "124455531" via a keyboard connected to the communication device 201, the client application 203 replaces the significant or repeated digits by the alphabet "K". For example, the client application 203 masks the banking account number as "KKKKK" and transfers the masked banking account number to a keyboard routine operating above a keyboard driver which may be intercepted by the malware. Since the client application 203 masks the banking account number, the malware cannot decipher the actual banking account number. Furthermore, in order to transfer the original keystrokes, the client application 203 encrypts 625 the keystrokes and transfers them over a secure communication channel to the rendering engine window procedure of the operating system for additional security. The client application 203 encrypts the keystrokes, for example, using an asymmetric encryption method and transfers the encrypted keystrokes over the secure communication channel.

Furthermore, the client application 203 prevents 626 screen capture of the display screen. For example, the client application 203 prevents the capturing of cursor movements or tactile movements initiated via an input medium. The input medium is, for example, a virtual keypad on a touch screen of the communication device 201 used by the user 401. In another example, the input medium is a computer mouse and the client application 203 initiates monitoring of the capture of cursor movements of the computer mouse when the user 401 moves the computer mouse over the virtual keypad to enter a personal identification number (PIN). The client application 203 prevents a malware from executing a print screen (Prt Scr) keystroke to graphically capture the cursor movements in the background. Further, the client application 203 monitors and prevents attempts by the malware to capture the display content. The client application 203 masks 627 the captured display content, for example, a screenshot displaying the personal information of the user 401 and passes the masked display content to the rendering engine window procedure of the operating system.

The client application 203 continuously monitors the online activities of the user 401 in the background. Consider an example where the user 401 invokes a default browser outside the environment of the client application 203. When the user 401 attempts to access a transaction website 402 that requests the user's 401 personal information, the client application 203 automatically redirects the user 401 to the client application 203. The client application 203 prompts the user 401 to open the client application 203 and alerts the user 401 about a connection to a transaction website 402 that requests for the user's 401 personal information.

It will be readily apparent that the various methods and algorithms disclosed herein may be implemented on computer readable media appropriately programmed for general purpose computers and computing devices. As used herein, the term "computer readable media" refers to non-transitory computer readable media that participate in providing data, for example, instructions that may be read by a computer, a processor or a like device. Non-transitory computer readable media comprise all computer readable media, for example, non-volatile media, volatile media, and transmission media, except for a transitory, propagating signal. Non-volatile media comprise, for example, optical disks or magnetic disks and other persistent memory volatile media including a dynamic random access memory (DRAM), which typically constitutes a main memory. Volatile media comprise, for example, a register memory, processor cache, a random access memory (RAM), etc. Transmission media comprise, for example, coaxial cables, copper wire and fiber optics, including the wires that constitute a system bus coupled to a processor. Common forms of computer readable media comprise, for example, a floppy disk, a flexible disk, a hard disk, a magnetic tape, any other magnetic medium, a compact disc-read only memory (CD-ROM), a digital versatile disc (DVD), any other optical medium, punch cards, paper tape, any other physical medium with patterns of holes, a random access memory (RAM), a programmable read only memory (PROM), an erasable programmable read only memory (EPROM), an electrically erasable programmable read only memory (EEPROM), a flash memory, any other memory chip or cartridge, or any other medium from which a computer can read. A "processor" refers to any one or more microprocessors, central processing unit (CPU) devices, computing devices, microcontrollers, digital signal processors or like devices. Typically, a processor receives instructions from a memory or like device, and executes those instructions, thereby performing one or more processes defined by those instructions. Further, programs that implement such methods and algorithms may be stored and transmitted using a variety of media, for example, the computer readable media in a number of manners. In an embodiment, hard-wired circuitry or custom hardware may be used in place of, or in combination with, software instructions for implementation of the processes of various embodiments. Thus, embodiments are not limited to any specific combination of hardware and software. In general, the computer program codes comprising computer executable instructions may be implemented in any programming language. Some examples of languages that can be used comprise C, C++, C#, Perl, Python, or JAVA. The computer program codes or software programs may be stored on or in one or more mediums as object code. The computer program product disclosed herein comprises computer executable instructions embodied in a non-transitory computer readable storage medium, wherein the computer program product comprises computer program codes for implementing the processes of various embodiments.

Where databases are described such as the trusted website certificate database 215c and the trusted root certificate database 215d, it will be understood by one of ordinary skill in the art that (i) alternative database structures to those described may be readily employed, and (ii) other memory structures besides databases may be readily employed. Any illustrations or descriptions of any sample databases disclosed herein are illustrative arrangements for stored representations of information. Any number of other arrangements may be employed besides those suggested by tables illustrated in the drawings or elsewhere. Similarly, any illustrated entries of the databases represent exemplary information only; one of ordinary skill in the art will understand that the number and content of the entries can be different from those disclosed herein. Further, despite any depiction of the databases as tables, other formats including relational databases, object-based models, and/or distributed databases may be used to store and manipulate the data types disclosed herein. Likewise, object methods or behaviors of a database can be used to implement various processes, such as those disclosed herein. In addition, the databases may, in a known manner, be stored locally or remotely from a device that accesses data in such a database. In embodiments where there are multiple databases in the system, the databases may be integrated to communicate with each other for enabling simultaneous updates of data linked across the databases, when there are any updates to the data in one of the databases.

The present invention can be configured to work in a network environment including a computer that is in communication, via a communications network, with one or more devices. The computer may communicate with the devices directly or indirectly, via a wired or wireless medium such as the Internet, a local area network (LAN), a wide area network (WAN) or the Ethernet, token ring, or via any appropriate communications means or combination of communications means. Each of the devices may comprise computers such as those based on the Intel® processors, AMD® processors, UltraSPARC® processors, Sun® processors, IBM® processors, etc., that are adapted to communicate with the computer. Any number and type of machines may be in communication with the computer.

The foregoing examples have been provided merely for the purpose of explanation and are in no way to be construed as limiting of the present invention disclosed herein. While the invention has been described with reference to various embodiments, it is understood that the words, which have been used herein, are words of description and illustration, rather than words of limitation. Further, although the invention has been described herein with reference to particular means, materials, and embodiments, the invention is not intended to be limited to the particulars disclosed herein; rather, the invention extends to all functionally equivalent structures, methods and uses, such as are within the scope of the appended claims. Those skilled in the art, having the benefit of the teachings of this specification, may affect numerous modifications thereto and changes may be made without departing from the scope and spirit of the invention in its aspects.

We claim:

1. A computer implemented method for protecting information and resources in an online environment, comprising:
providing a process initialization monitor application and a client application on a communication device of a user;
monitoring process initialization of said client application by said process initialization monitor application;
identifying one or more components operating on said communication device and one or more third party applications attempting to access said client application during performance of activities by said user in said online environment;
authenticating said one or more components of said communication device and said one or more third party applications by said client application, wherein said authentication is performed by a code integrity check integrated in said client application independent of said communication device, and wherein said client application grants access to said authenticated one or more components and said authenticated one or more third party applications;
protecting said information and said resources being processed, exchanged, stored, and displayed within said client application; and
monitoring network providers by said client application for detecting attempts by unauthorized entities to one of layer and replace an application code on one or more layers of a network stack of an operating system of said communication device, when said network stack is initialized within an environment of said client application, wherein said client application bypasses said unauthorized entities and loads authorized network providers on said one or more layers of said network stack of said operating system of said communication device within said environment of said client application.

2. The computer implemented method of claim 1, wherein said protection of said information comprises one or more of:
masking input information acquired from said user via an input device associated with said communication device, by said client application for protecting said input information from being accessed by said unauthorized entities; and
masking display content captured from interfaces of said client application and said communication device.

3. The computer implemented method of claim 1, wherein said protection of said information comprises encrypting a communication channel that transfers input information acquired from said user via an input device associated with said communication device, by said client application for securing said transfer of said input information.

4. The computer implemented method of claim 1, wherein said protection of said information and said resources comprises blocking attempts by said unauthorized entities to monitor, intercept, and manipulate said information and preventing access of certificates, resources of said client application, and said information by said unauthorized entities in said online environment, by said client application.

5. The computer implemented method of claim 1, wherein said protection of said information comprises preventing redirection from a requested online destination to one or more of said unauthorized entities in said online environment by said client application.

6. The computer implemented method of claim 1, further comprising providing a secure domain name system server that bypasses a default configured domain name system for preventing redirection from a requested online destination to said one or more of said unauthorized entities in said online environment.

7. The computer implemented method of claim 1, further comprising prohibiting access of memory content to said unauthorized entities and manipulation of code and data of said client application by said unauthorized entities.

8. The computer implemented method of claim 1, further comprising providing one of a hypertext transfer protocol layer and a hypertext transfer protocol secure layer integrated with said client application for validating requests for state information in said online environment and preventing attempts by said unauthorized entities to one or more of intercept said state information and manipulate said information exchanged in said online environment.

9. The computer implemented method of claim 1, further comprising providing one or more databases that store said certificates of a plurality of validated online portals in said online environment, wherein said client application protects said one or more databases from tampering.

10. The computer implemented method of claim 9, further comprising verifying authenticity of a requested online portal by said client application by verifying said certificates received from said requested online portal against said stored certificates in said one or more databases.

11. The computer implemented method of claim 1, further comprising continuously monitoring said activities performed by said user in said online environment for one of automatically invoking said client application for protecting said information and said resources being processed, exchanged, stored, and displayed in said online environment, and alerting said user to manually invoke said client application.

12. The computer implemented method of claim 1, wherein said monitoring of said process initialization of said client application by said process initialization monitor application comprises one or more of:
  monitoring operating system libraries loaded for said process initialization of said client application on said communication device;
  blocking attempts by said unauthorized entities to load malicious libraries and alternate code paths within said client application; and
  preventing interception of library calls by said unauthorized entities.

13. The computer implemented method of claim 1, wherein said monitoring of said process initialization of said client application by said process initialization monitor application comprises monitoring requests of said one or more components and said one or more third party applications to access processes and threads of said client application, and automatically altering access permissions of said unauthorized entities for preventing modification of memory content and execution of alternate code paths of said client application by said unauthorized entities.

14. The computer implemented method of claim 1, further comprising monitoring access to objects that expose services in said online environment by said client application and ensuring loading of authenticated original component services exposed by said objects.

15. A non-transitory computer readable medium for protecting information and resources in an online environment, comprising:
  a process initialization monitor application that monitors process initialization of a client application provided on a communication device of a user;
  said client application comprising:
    a component identification module that identifies one or more components operating on said communication device and one or more third party applications attempting to access said client application during performance of activities by said user in said online environment;
    an authentication module that authenticates said one or more components of said communication device and said one or more third party applications, wherein said authentication module comprises a code integrity check module integrated in said client application independent of said communication device, wherein said code integrity check module authenticates said one or more components and said one or more third party applications independent of said communication device;
    an access control module that grants access to said authenticated one or more components and said authenticated one or more third party applications; and
    a security module that protects said information and said resources being processed, exchanged, stored, and displayed within said client application, wherein said security module comprises one or more of:
      a user input protection module that masks input information acquired from said user via an input device associated with said communication device for protecting said input information from being accessed by unauthorized entities;
      a display content access interception module that masks display content captured from interfaces of said client application and said communication device;
      an encryption module that encrypts a communication channel that transfers said input information acquired from said user via said input device associated with said communication device, for securing said transfer of said input information; and
      a blocking module that blocks attempts to monitor, intercept, and manipulate said information by said unauthorized entities and prevents access of certificates, resources of said client application, and said information by said unauthorized entities in said online environment, wherein said blocking module comprises:
        a library loader interception module that monitors access requests to load library components during said performance of said activities by said user in said online environment;
        an object loader interception module that monitors access to objects that expose services in said online environment and ensures loading of authenticated original component services exposed by said objects; and
        a network provider loader interception module that monitors network providers for detecting attempts by said unauthorized entities to one of layer and replace an application code on one or more layers of a network stack of an operating system of said communication device, when said network stack is initialized within an environment of said client application, wherein said network provider loader interception module bypasses said unauthorized entities and loads authorized network providers on said one or more layers of said network stack of said operating system of said communication device within said environment of said client application.

16. The computer implemented system of claim 15, wherein said client application further comprises a browser redirection module that continuously monitors said activities performed by said user in said online environment for one of automatically invoking said client application for protecting said information and said resources being processed, exchanged, stored, and displayed in said online environment and alerting said user to manually invoke said client application.

17. The computer implemented system of claim 15, wherein said process initialization monitor application comprises:
  a library loading monitoring module that monitors operating system libraries loaded for said process initialization of said client application on said communication device, blocks attempts by said unauthorized entities to load malicious libraries and alternate code paths within said client application, and prevents interception of library calls by said unauthorized entities;
  a process access interception module that monitors requests of said one or more components and said one or more third party applications to access processes of said client application and blocks attempts by said unauthorized entities to access said processes of said client application; and
  a thread access interception module that monitors requests of said one or more components and said one or more third party applications to access threads of said client application and blocks attempts by said unauthorized entities to access said threads of said client application.

18. The computer implemented system of claim 17, wherein said process access interception module and said thread access interception module performs:

automatically altering access permissions of said unauthorized entities for preventing modification of memory content and execution of alternate code paths of said client application by said unauthorized entities; and prohibiting access of said memory content to said unauthorized entities and manipulation of code and data of said client application by said unauthorized entities.

19. A non-transitory computer readable medium of claim 15, wherein said client application further comprises:

one or more databases that store said certificates of a plurality of validated online portals in said online environment; and a certificate verification module that verifies authenticity of a requested online portal by verifying said certificates received from said requested online portal against said stored certificates in said one or more databases.

20. A non-transitory computer readable medium of claim 15, wherein said client application further comprises a hypertext transfer protocol module that validates requests for state information in said online environment, prevents attempts by said unauthorized entities to one or more of intercept said state information and manipulate said information exchanged in said online environment.

21. A non-transitory computer readable medium of claim 15, further comprising a secure domain name system server that bypasses a default configured domain name system, in communication with a redirection safeguard module of said client application for preventing redirection from a requested online destination to one or more of said unauthorized entities in said online environment.

22. A computer program product comprising computer executable instructions embodied in a non-transitory computer readable storage medium, wherein said computer program product comprises:

a first computer program code for monitoring process initialization of a client application on a communication device of a user;

a second computer program code for identifying one or more components operating on said communication device and one or more third party applications attempting to access said client application during performance of activities by said user in an online environment;

a third computer program code for authenticating said one or more components of said communication device and said one or more third party applications, and granting access to said authenticated one or more components and said authenticated one or more third party applications, wherein said authentication is performed by a code integrity check integrated in said client application independent of said communication device;

a fourth computer program code for protecting information and resources being processed, exchanged, stored, and displayed within said client application;

a fifth computer program code for masking input information acquired from said user via an input device associated with said communication device for protecting said input information from being accessed by unauthorized entities;

a sixth computer program code for masking display content captured from interfaces of said client application and said communication device;

a seventh computer program code for encrypting a communication channel that transfers said input information acquired from said user via said input device associated with said communication device, for securing said transfer of said input information;

an eighth computer program code for blocking attempts to monitor, intercept, and manipulate said information and preventing access of certificates, resources of said client application, and said information by said unauthorized entities in said online environment;

a ninth computer program code for preventing redirection from a requested online destination to one or more of said unauthorized entities in said online environment;

a tenth computer program code for continuously monitoring said activities performed by said user in said online environment for one of automatically invoking said client application for said protection of said information and said resources being processed, exchanged, stored, and displayed in said online environment, and alerting said user to manually invoke said client application;

an eleventh computer program code for monitoring network providers for detecting attempts by one or more of said unauthorized entities to one of layer and replace an application code on one or more layers of a network stack of an operating system of said communication device when said network stack is initialized within an environment of said client application, bypassing said one or more unauthorized entities, and loading authorized network providers on said one or more layers of said network stack of said operating system of said communication device, within said environment of said client application; and a twelfth computer program code for monitoring access to objects that expose services in said online environment and ensuring loading of authenticated original component services exposed by said objects.

* * * * *